United States Patent
Thirumoorthy

(10) Patent No.: US 8,233,524 B2
(45) Date of Patent: Jul. 31, 2012

(54) RADIO TRANSMITTER IQ IMBALANCE MEASUREMENT AND CORRECTION METHODS AND APPARATUS

(75) Inventor: Hari Thirumoorthy, Chandler, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 658 days.

(21) Appl. No.: 12/403,075

(22) Filed: Mar. 12, 2009

(65) Prior Publication Data
US 2010/0232493 A1    Sep. 16, 2010

(51) Int. Cl.
*H03H 7/30* (2006.01)
(52) U.S. Cl. .................................. 375/235; 375/298
(58) Field of Classification Search .......... 375/219–220, 375/226, 295–298, 232, 329
See application file for complete search history.

(56) References Cited

U.S. PATENT DOCUMENTS

| | | | |
|---|---|---|---|
| 7,139,536 B2 * | 11/2006 | Chiu | 455/115.1 |
| 7,167,513 B2 | 1/2007 | Tsui et al. | |
| 7,184,714 B1 | 2/2007 | Kutagulla et al. | |
| 7,313,203 B2 | 12/2007 | Tubbax et al. | |
| 7,336,730 B2 | 2/2008 | Auranen et al. | |
| 7,366,255 B1 | 4/2008 | Hwang et al. | |
| 8,018,990 B2 * | 9/2011 | Lee et al. | 375/226 |
| 2003/0174783 A1 * | 9/2003 | Rahman et al. | 375/298 |
| 2004/0193965 A1 * | 9/2004 | Coersmeier | 714/48 |
| 2004/0224715 A1 * | 11/2004 | Rosenlof et al. | 455/522 |
| 2007/0147527 A1 | 6/2007 | Egashira et al. | |
| 2007/0165748 A1 | 7/2007 | Khlat et al. | |
| 2007/0202812 A1 * | 8/2007 | Park et al. | 455/75 |
| 2007/0274471 A1 * | 11/2007 | Shako et al. | 379/88.01 |
| 2008/0310552 A1 | 12/2008 | O'Keefe et al. | |

FOREIGN PATENT DOCUMENTS

| | | |
|---|---|---|
| EP | 1376967 A2 | 1/2004 |
| EP | 1624636 A1 | 2/2006 |
| WO | 2008089841 A1 | 7/2008 |

OTHER PUBLICATIONS

Valkama, M., et al., Advanced Methods for I/Q Imbalance Compensatin in Communication Receivers, IEEE Transactions on Signal Processing, vol. 49., No. 10, Oct. 2001.

Tarighat, A., et al., Compensation Schemes and Performance Analysis of IQ Imbalances in OFDM Receivers, IEEE Transactions on Signal Processing, vol. 53., No. 8, Aug. 2005.

Valkama, M., et al., Some Radio Implementation Challenges in 3G-LTE Context, Signal Processing Advances in Wireless Communications, 2007. SPAWC 2007. IEEE 8th Workshop, Volume , Issue , Jun. 17-20, 2007.

* cited by examiner

*Primary Examiner* — Emmanuel Bayard
(74) *Attorney, Agent, or Firm* — Sherry W. Schumm

(57) ABSTRACT

Embodiments include transceivers and transmit IQ imbalance correction methods. A transmitter lineup, which includes an equalizer and an RF modulator, receives a stream of baseband samples having real and imaginary components, processes the real components along a first channel, and processes the imaginary components along a second channel to produce processed real and imaginary components. The equalizer equalizes at least one of the processed real components and the processed imaginary components to compensate for offset frequency-dependent components of transmitter IQ imbalance. The RF modulator receives and modulates analog versions of the equalized samples, resulting in an analog RF signal. An embodiment also includes a balancer adapted to apply IQ gain and phase correction to the equalized samples to compensate for offset frequency-independent components of the transmitter IQ imbalance. A calibration processing subsystem determines filter coefficients used by the equalizer and IQ gain and phase correction values used by the balancer.

20 Claims, 8 Drawing Sheets

RADIO TRANSMITTER IQ IMBALANCE MEASUREMENT AND CORRECTION METHODS AND APPARATUS

TECHNICAL FIELD

Embodiments of the inventive subject matter relate to signal processing in wireless transmitters and transceivers, and more particularly to measuring and correcting transmitter IQ amplitude and phase imbalances present in signals that are processed in transmitters.

BACKGROUND

In a conventional cellular telephone, a modem provides a stream of complex, digital baseband samples to a transmitter, where the baseband samples are represented by real components and imaginary components (e.g., I and Q components). Along a digital portion of the transmitter lineup, the real components are processed along a first channel (a "real" channel), and the imaginary components are processed along a second channel (an "imaginary" channel), which is parallel to the first channel. The digital processing along either channel may include multiplexing, filtering, power control, and up-sampling processes, among other things. After converting the digitally-processed real and imaginary components to the analog domain (e.g., using digital-to-analog converters), the resulting analog signals corresponding to the real and imaginary channels are filtered, in parallel, along a subsequent, analog portion of the transmitter lineup. The parallel, filtered analog signals are then modulated to produce a single-channel, analog radio frequency (RF) signal. The RF signal is then amplified and radiated onto the air interface.

Ideally, along the analog portion of the transmitter lineup in which the real and imaginary signal components are processed along parallel channels (e.g., portions of the digital-to-analog converter, analog filter, and modulator), the circuit elements along one channel would be perfectly matched with corresponding circuit elements along the other, parallel channel. In actuality, however, the corresponding circuit elements along the real and imaginary channels are likely to have slight or relatively significant operational differences from each other due to manufacturing process variations and geometry differences, among other things. These differences may produce non-negligible amplitude differences ("amplitude-IQ-imbalances") and phase differences ("phase-IQ-imbalances") between the real and imaginary signals that are processed along the parallel channels.

Non-negligible amplitude-IQ-imbalances and phase-IQ-imbalances may be imposed by transmitters that are adapted to implement 2G (second generation), 2.5G (2.5 generation), 3G (third generation), and/or other wireless communication technologies. The characteristics of the modulation techniques performed in these conventional transmitters are such that factory calibration procedures (e.g., performed during manufacture) may be sufficient to provide adequate transmitter IQ imbalance correction across typical ranges of the device's operational parameters (e.g., transmit frequencies, battery charge, temperature, and so on). However, these factory calibration procedures tend to be time consuming, and therefore they do increase manufacturing time and cost.

More recent 4G (fourth generation) wireless communication technologies, however, propose to implement modulation techniques in which factory calibration may be impractical (e.g., too time-consuming to perform, and thus too costly). More particularly, at least some devices implementing 4G technologies may use OFDM (Orthogonal Frequency Division Multiplexing) for digital, multi-carrier modulation. With OFDM, a large number of closely-spaced, orthogonal sub-carriers are used to carry data within a frequency band. Within the band, each sub-carrier is positioned at a distinct offset frequency from a substantially band-centered carrier frequency. Data to be transmitted are divided into multiple parallel data streams (i.e., one for each sub-carrier), and the data stream corresponding to each sub-carrier is modulated with a conventional modulation scheme (e.g., QAM (Quadrature Amplitude Modulation) or PSK (Phase Shift Keying)). Effective factory calibration may necessitate calibration procedures for some or all sub-carriers associated with some or all carrier frequencies within the operational bandwidth. Accordingly, factory calibration for 4G devices would be even more time consuming than factory calibration procedures for 2G, 2.5G, and 3G devices. Because this would significantly increase manufacturing time and cost for 4G devices, factory calibration for 4G devices is an undesirable approach to providing transmitter IQ imbalance correction.

As an alternative, transmitter IQ imbalances may be left uncorrected. However, in devices in which modulation techniques such as those associated with 4G technologies are implemented, non-negligible transmitter IQ imbalances, left uncorrected, may result in unacceptably poor image rejection at some offset frequencies within the operational bandwidth. Accordingly, methods and apparatus are desired for measuring and correcting for transmitter IQ imbalances in wireless devices in which such imbalances may result in unacceptably degraded signal quality (e.g., wireless devices in which OFDM is performed). Additionally, it is desired that such methods and apparatus do not include time consuming factory calibration procedures.

DETAILED DESCRIPTION

Embodiments described herein include methods and apparatus for measuring and correcting IQ amplitude and phase imbalances present in signals that are processed in transmitters. The incorporation of various embodiments may be particularly advantageous in wireless systems, networks, and devices adapted to implement 4G (fourth generation) wireless telephone technologies, and more particularly in wireless systems, networks, and devices that implement OFDM (Orthogonal Frequency Division Multiplexing) as a digital, multi-carrier modulation technique. However, it is to be understood that embodiments also may be implemented, for example, in wireless systems, networks, and devices adapted to implement 2G (second generation), 2.5G (2.5 generation), 3G (third generation), and/or other wireless telephone technologies and/or modulation techniques. For example, but not by way of limitation, embodiments may be implemented in wireless systems, networks, and devices that operate in accordance with one or more of various standards within a group that includes the family of $3^{rd}$ Generation Partnership Project (3GPP) standards (e.g., Global System for Mobile Communications (GSM) standards and/or Universal Mobile Telecommunications System (UMTS) standards). Examples of such standards include, but are not limited to, UMTS Rev. 8 (e.g., 3GPP Long Term Evolution (LTE), Enhanced Data Rates for Global System for Mobile Communications (GSM) Evolution (EDGE), Wideband Code Division Multiple Access (W-CDMA), UMTS Time Division Duplexing (UMTS-TDD) (e.g., TD-CDMA and TD-SCDMA), and General Radio Packet Service (GPRS). Alternate embodiments may be implemented in wireless systems, networks, and devices that operate in accordance with one or more other standards within a group that includes the family of $3^{rd}$ Generation Partnership Project 2 (3GPP2) standards. Although a particular type of wireless system, network, and/or device may be described herein for example purposes, the example system is not to be interpreted as limiting the scope of the various embodiments or the claims only to the below-described system or device.

Figure 1:
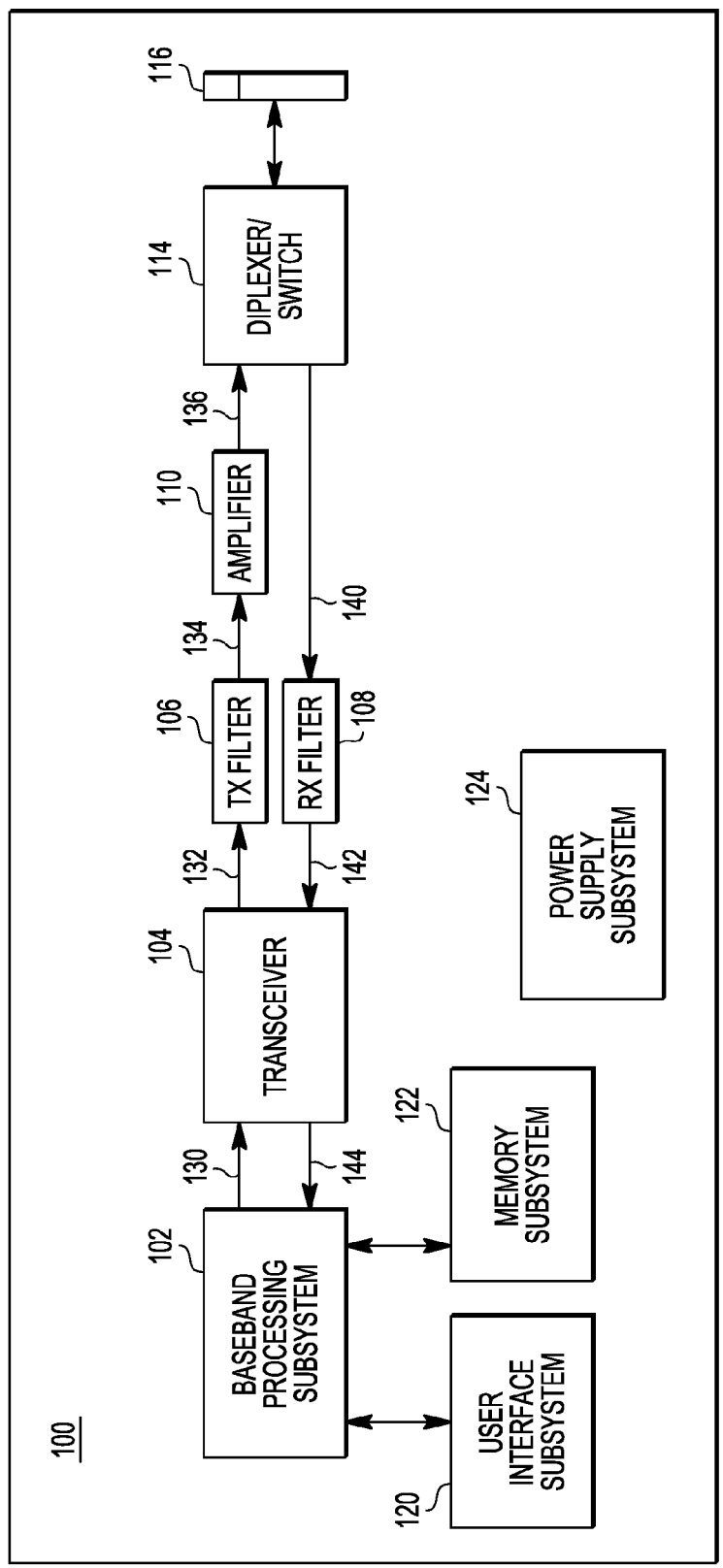
FIG. 1 illustrates a simplified block diagram of a wireless device, in accordance with an example embodiment.

FIG. 1 illustrates a simplified block diagram of a wireless device 100, in accordance with an example embodiment. Device 100 is adapted to transmit electromagnetic signals over an air interface. In a particular embodiment, wireless device 100 is adapted to transmit radio frequency (RF) signals over the air interface that are modulated using an OFDM digital modulation technique, although wireless device 100 may be adapted to transmit different types of RF signals over the air interface that are modulated using different modulation techniques, in other embodiments. Wireless device 100 may be incorporated into a variety of different types of apparatus. For example, but not by way of limitation, wireless device 100 may be incorporated into a cellular telephone, a radio, a personal data assistant (PDA), a computer (e.g., a laptop, notebook, desktop or other type of computer), a mobile internet device (MID), and/or another device that is adapted to transmit electromagnetic signals over an air interface.

Wireless device 100 includes at least one baseband processing subsystem 102, transceiver 104, analog RF transmit (TX) filter 106, analog RF receive (RX) filter 108, power amplifier 110, diplexer/switch 114, antenna 116, user interface subsystem 120, memory subsystem 122, and power supply subsystem 124, in an embodiment. These subsystems are operably coupled together as illustrated in FIG. 1, where the term "operably coupled" means that, during operation, signals, information, or other electric energy are transmissible through various interconnections between the subsystems. The interconnections between the subsystems may be direct interconnections that include conductive transmission media, or may be indirect interconnections that include one or more intermediate electrical components. Although certain interconnections are illustrated in FIG. 1, it is to be understood that more, fewer or different interconnections may be present in other embodiments.

User interface subsystem 120 may include one or more user interface components adapted to enable a user to input commands or other information (e.g., speech and data) into device 100 and/or for device 100 to provide visual, auditory, or mechanical indicia intended to convey information to the user. For example, but not by way of limitation, user interface subsystem 120 may include one or more display screens, touch screens, lights, speakers, microphones, vibration devices, keypads, buttons, dials, and/or other components adapted to receive input commands or information and/or to convey information to the user.

Memory subsystem 122 may include one or more components adapted to store digital information in a retrievable format. For example, but not by way of limitation, memory subsystem 122 may include one or more removable or non-removable, volatile or non-volatile memory components, such as read only memory (ROM)-based memory components, random access memory (RAM)-based memory components, compact disks (CDs), digital video disks (DVDs), and/or magnetic storage media (e.g., hard disks or floppy disks), to name a few.

The baseband processing subsystem 102 is adapted to perform various functions. These functions may include, for example, interfacing with the at least one memory subsystem 122 to store and retrieve data, interfacing with the at least one user interface subsystem 120 to receive or provide information and signals, and performing various power control functions in conjunction with the at least one power supply subsystem 124. In addition, baseband processing subsystem 102 is adapted to generate baseband, digital transmit signal 130 and to process baseband, digital receive signal 144. Generating digital transmit signal 130 may include, for example, packetizing data (e.g., symbols modulated using QAM (Quadrature Amplitude Modulation)) in compliance with a pre-defined protocol and performing error correction, among other things. According to an embodiment, digital transmit signal 130 includes a stream of complex, digital baseband samples, where real (I) components of the samples are provided in parallel with imaginary (Q) components of the samples. Similarly, digital receive signal 144 includes a stream of complex digital baseband samples represented by parallel streams of real and imaginary sample components. Processing the digital receive signal 144 may include, for example, parsing, demodulating, and processing data represented in the digital receive signal 144 in accordance with the pre-defined protocol with which the digital receive signal 144 was produced.

As will be described in more detail in conjunction with FIG. 2, transceiver 104 includes a transmitter lineup (e.g., transmitter lineup 202, FIG. 2), a receiver lineup (e.g., receiver lineup 204, FIG. 2), and a calibration subsystem (e.g., calibration subsystem 206, FIG. 2). In simplified terms, the transmitter lineup is adapted to receive the digital transmit signal 130 from baseband processing subsystem 102, to process and convert the digital transmit signal 130 into an analog signal, and to up-convert the analog signal to an RF frequency, in order to produce an analog RF transmit signal 132. The analog RF transmit signal 132 is filtered by RF transmit (TX) filter 106 (e.g., an analog implementation of a finite impulse response (FIR) filter, such as a surface acoustic wave (SAW) filter), and the resulting filtered transmit signal 134 is amplified by amplifier 110 (e.g., an amplification subsystem that includes a power amplifier). During a transmit interval, the resulting amplified RF transmit signal 136 may then be provided by diplexer/switch 114 to antenna 116, which radiates the signal onto the air interface.

RF signals transmitted by the device's antenna 116 may be received by infrastructure (e.g., a base station or "Node B", not illustrated) associated with a wireless communication system. According to prevailing regulations, the wireless device 100 may be restricted only to transmit RF signals within a pre-defined "uplink" frequency band. For example, a particular communication system may support communications within a frequency band between about 1920 megahertz (MHz) and about 1980 MHz, which corresponds to about 60 MHz total bandwidth. In alternate embodiments, a communication system may support communications within different frequency bands and/or may have a wider or narrower bandwidth.

Antenna 116 also may receive an RF signal present on the air interface, and during a receive interval, the RF receive signal 140 may be provided by diplexer/switch 114 to RF receive (RX) filter 108 (e.g., a SAW filter). RX filter 108 filters the RF receive signal 140, and provides the resulting filtered, RF receive signal 142 to the receiver lineup of transceiver 104. Again, in simplified terms, the receiver lineup of transceiver 104 is adapted to down-convert and demodulate the RF receive signal 142, among other things, and to convert the resulting baseband, analog, receive signal into the baseband, digital receive signal 144. The baseband, digital receive signal 144 is then processed by baseband processing subsystem 102.

As mentioned above, transceiver 104 includes a transmitter lineup (e.g., transmitter lineup 202, FIG. 2), a receiver lineup (e.g., receiver lineup 204, FIG. 2), and a calibration subsystem (e.g., calibration subsystem 206, FIG. 2), according to an embodiment. As will be described in further detail below, the calibration subsystem is adapted to perform a calibration procedure, in which the calibration subsystem provides one or more input calibration tones (e.g., tones at a plurality of different frequencies) to the transmitter lineup, feeds back a resulting RF signal that is produced by the transmitter lineup to the receiver lineup, and receives a resulting, output digital signal from the receiver lineup. Based on the received digital signals, the calibration subsystem is further adapted to estimate IQ imbalances produced by the transmitter lineup, and to calibrate an equalizer and balancer within the transmitter lineup in order to correct for the IQ imbalances, according to various embodiments. These procedures will be described in more detail in conjunction with FIGS. 2-9.

Figure 2:
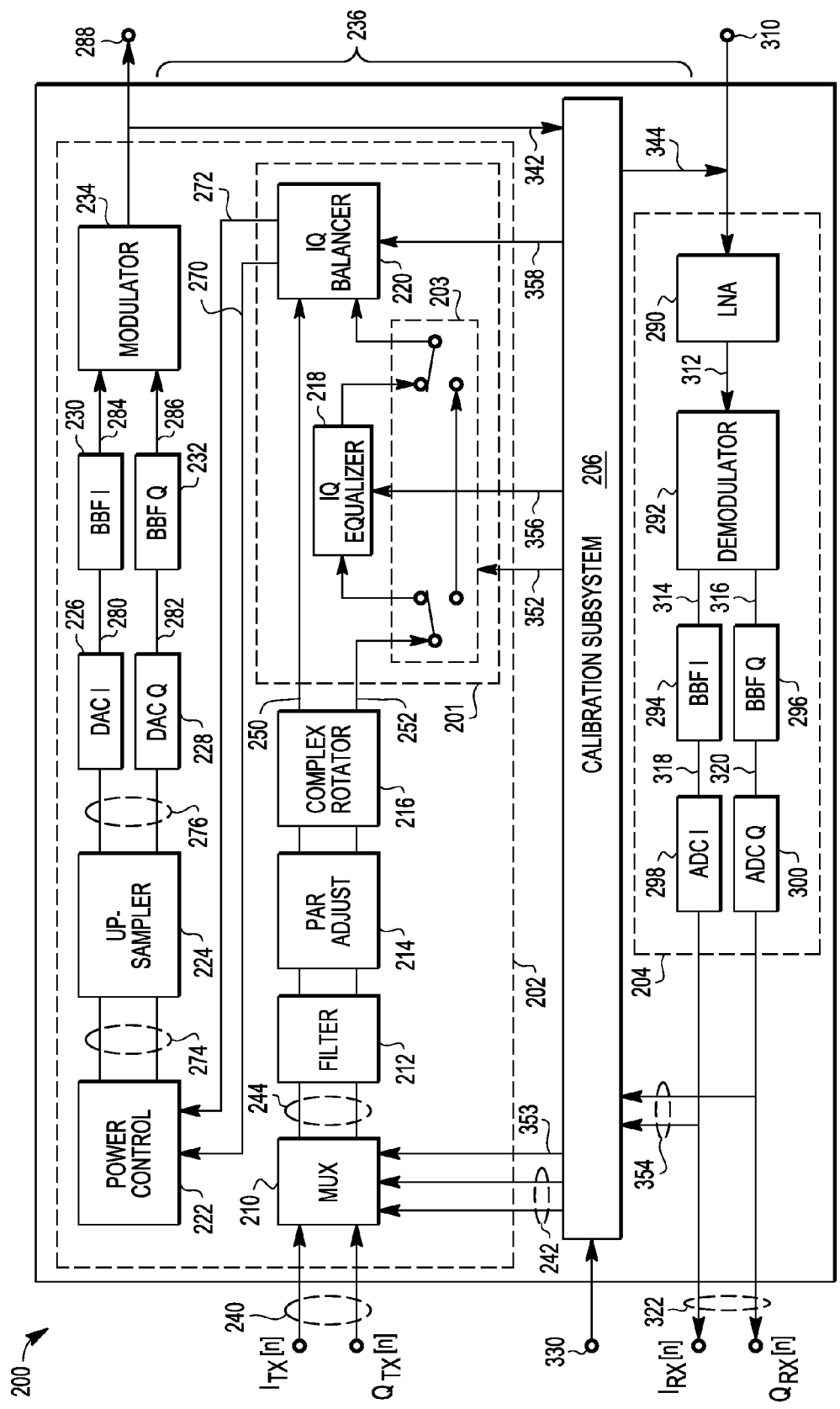
FIG. 2 illustrates a simplified block diagram of transceiver with an IQ imbalance correction system configured in a pass-through mode, in accordance with an example embodiment.

FIG. 2 illustrates a simplified block diagram of transceiver 200 with an IQ imbalance correction system 201 configured in a pass-through mode, in accordance with an example embodiment. As will be explained in more detail below, the IQ imbalance correction system 210 may be configured in the pass-through mode (as opposed to a bypass mode, described later in conjunction with FIG. 3) during the processing of data-bearing samples (e.g., digital input samples 240, described below).

Transceiver 200 includes a transmitter lineup 202, a receiver lineup 204, and a calibration subsystem 206, according to an embodiment. According to an embodiment, all or substantially all of the transceiver lineup 202, the receiver lineup 204, and the calibration subsystem 206 are located on a single integrated circuit (e.g., a "transceiver IC"). In other embodiments, all or portions of the transceiver lineup 202, the receiver lineup 204, and/or the calibration subsystem 206 may be dispersed across multiple integrated circuits. For purposes of clarity, the functionality of transmitter lineup 202 and receiver lineup 204 during normal data transmission and reception will first be described in detail. Calibration subsystem 206 will be described in more detail later, in conjunction with a description of calibration procedures that may be performed by the transceiver 200, according to various embodiments.

In an embodiment, transmitter lineup 202 receives a sequence of digital input samples 240 (e.g., baseband, digital transmit signal 130 from baseband processing subsystem 102, FIG. 1). The sequence of digital input samples 240 includes a baseband sequence of multiple input data samples, which may include, for example, a sequence of discrete time samples of a signal to be transmitted (e.g., a transmission burst). In an embodiment, the sequence of digital input samples 240 includes a sequence of complex values represented in Cartesian coordinates, so that each value has a real part (I) and an imaginary part (Q), which are received in parallel, as shown in FIG. 2. Accordingly, digital input samples 240 may include a sequence of values that may be represented as $X(k)=[I(k), Q(k)]$, where k indicates a sample number and k=1 ... K, I(k) represents a real part of an input data sample, and Q(k) represents an imaginary part of an input data sample. In alternate embodiments, digital input samples 240 may include sequences of values represented in polar coordinates or some other representation. Digital input samples 240 could represent, for example, baseband, time-domain representations of a sequence of symbols. According to an embodiment, digital input samples 240 may be provided at a GSM data rate (e.g., about 270,833 symbols/second on an I-channel), at an EDGE date rate (e.g., about 270,833 symbols/second on an I-channel and a Q-channel), at a WCDMA rate (e.g., about 3,840,000 symbols/second on an I-channel and a Q-channel) or at an LTE rate (e.g., a variable rate), although digital input samples 240 may be provided at different data rates, in other embodiments.

Transmitter lineup 202 includes a multiplexer (MUX) 210, pulse shaping filter 212, peak-to-average ratio (PAR) adjust module 214, complex rotator 216, IQ equalizer 218, IQ balancer 220, power control module 222, up-sampler 224, digital-to-analog converters (DAC) 226, 228, baseband filters (BBF) 230, 232, and modulator 234, according to an embodiment. A first, digital portion of the transmitter lineup 202 includes MUX 210, pulse shaping filter 212, PAR adjust module 214, complex rotator 216, IQ equalizer 218, IQ balancer 220, power control module 222, up-sampler 224, and portions of DACs 226, 228. A subsequent, analog portion of the transmitter lineup 202 includes other portions of DACs 226, 228, BBFs 230, 232, and modulator 234. Between the input to MUX 210 and modulator 234, the real parts of the digital input samples 240 or digital calibration tone samples 242 (described later) are processed along a first channel (a "real" channel), and the imaginary parts of the digital input samples 240 are processed along a second channel (an "imaginary" channel), which is parallel to the first channel.

MUX 210 is adapted to receive the digital input samples 240 and digital calibration tone samples 242, to select one or the other of samples 240 or 242, and to pass the selected digital samples 244 to pulse shaping filter 212. The digital calibration tone samples 242 and the conditions under which they are selected will be described in more detail later. Pulse shaping filter 212 is adapted to implement a pulse shaping filter to modify the spectral shape of the selected digital samples 244 in order to meet the spectral requirements of any applicable standard (e.g., a 3GPP LTE or other standard). Peak-to-average ratio (PAR) adjust module 214 is adapted to apply complex processing to reduce the ratio of peak sample power (over one to N packets) to average sample power (over the same duration).

According to an embodiment, the PAR-adjusted digital samples 248 may be processed by complex rotator 216 during a calibration procedure, which will be described in more detail later. When a calibration procedure is not being performed (e.g., during the processing of data-bearing, digital input samples 240), the PAR-adjusted digital samples 248 bypass complex rotator 216 and are provided to IQ imbalance correction system 201 on real and imaginary channels 250, 252, according to an embodiment. According to an alternate embodiment, when the calibration procedure is not being performed, complex rotator 216 may be configured to apply a zero degree rotation to the PAR-adjusted digital samples 248, in order to produce signals on the real and imaginary channels 250, 252. For purposes of clarity, complex rotator 216 will be described in more detail later, in conjunction with the description of the calibration procedure. In an alternate embodiment, complex rotator 216 is excluded altogether from system 200 (i.e., complex rotation of the PAR-adjusted digital samples 248 is not performed, even during the calibration procedure).

Figure 3:
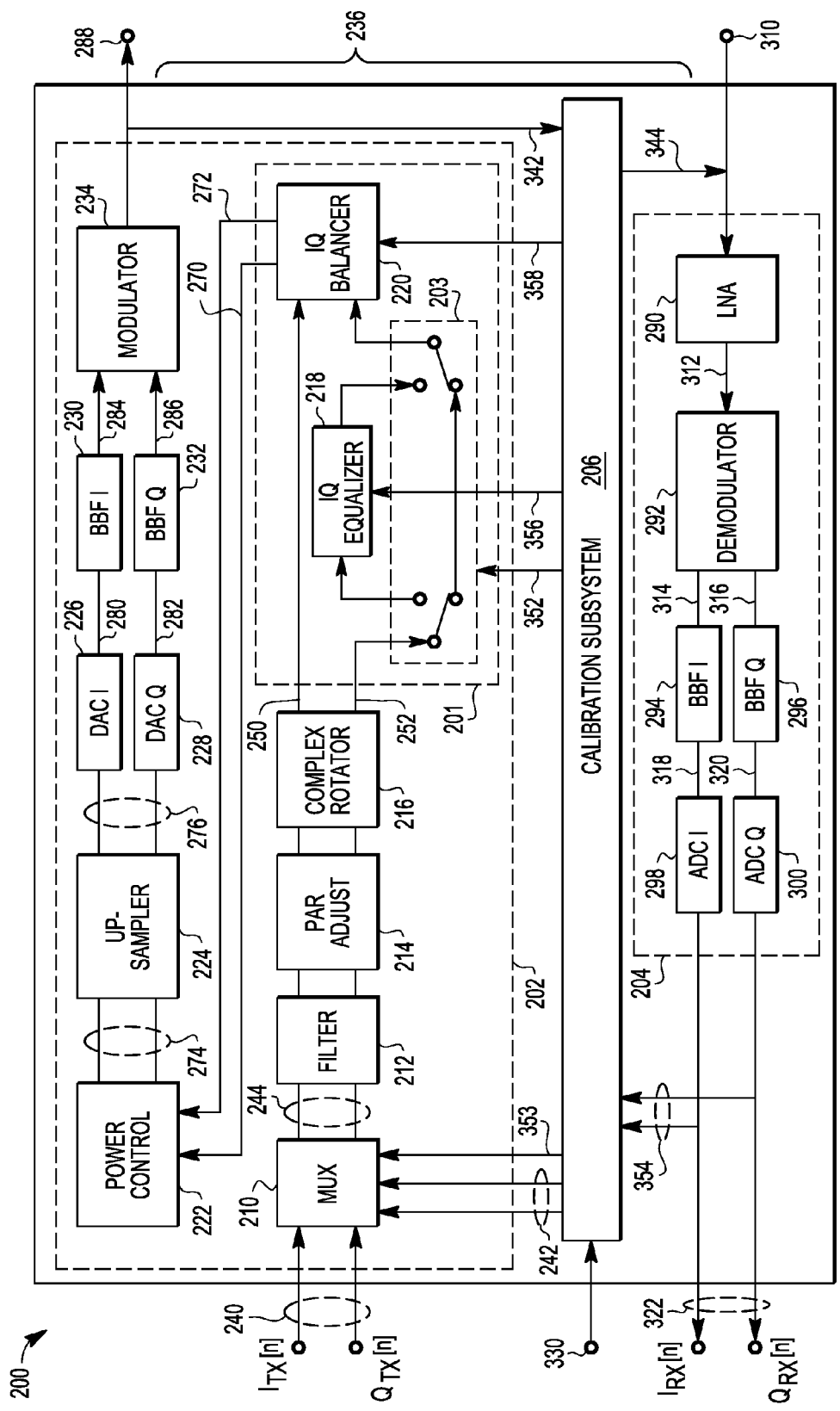
FIG. 3 illustrates a simplified block diagram of transceiver with an IQ imbalance correction system configured in a bypass mode, in accordance with an example embodiment.

The IQ imbalance correction system 201 includes IQ equalizer 218 and IQ balancer 220. During the processing of data-bearing samples (e.g., data-bearing, digital input samples 240), the transmitter lineup 202 (or more particularly, the IQ imbalance correction system 201) is configured in a pass-through mode, as shown in FIG. 2. According to an embodiment, the IQ imbalance correction system 201 may be configured into the pass-through mode or into a bypass mode through the manipulation of a plurality of switches of a mode select switching network 203. As will be described in more detail in conjunction with FIG. 4, the switches of the mode select switching network 203 may be controlled based on a configuration control signal 352 provided by calibration subsystem 206. When the switches of the mode select switching network 203 are controlled into a first configuration (as shown in FIG. 2), the IQ imbalance correction system 201 is configured in a pass-through mode. When the switches of the mode select switching network 203 are controlled into a second configuration (as shown in FIG. 3), the transmitter lineup 202 (or more particularly, the IQ imbalance correction system 201) is configured in a bypass mode. Essentially, the mode select switching network 203 is adapted to route the processed real components and the processed imaginary components around IQ equalizer 218 during a calibration procedure and to route the processed real components or the processed imaginary components through the IQ equalizer 218 when calibration is not being performed. Although the mode select switching network 203 is illustrated to include a particular configuration of switches, different configurations of switches may be implemented in alternate embodiments, which enable the IQ imbalance correction system 201 to be selectively configured into a pass-through mode or a bypass mode, in alternate embodiments.

While the IQ imbalance correction system 201 is configured in the pass-through mode, as shown in FIG. 2, IQ equalizer 218 is adapted to receive samples present on at least one of the real channel 250 or the imaginary channel 252 (e.g., one or both channels), and to compensate for offset frequency-dependent components of transmitter IQ imbalance by performing an equalization procedure on the received samples, according to an embodiment. According to a more particular embodiment, IQ equalizer 218 is adapted to receive samples on either the real channel 250 or the imaginary channel 252, but not both, and to perform the equalization procedure on the received samples from the one channel (e.g., the imaginary channel 252), while the samples present on the other channel (e.g., the real channel 250) bypass IQ equalizer 218. Although IQ equalizer 218 is shown to be connectable to the imaginary channel 252 in FIG. 2, IQ equalizer 218 alternatively may be connectable to the real channel 250, according to an alternate embodiment. According to yet another alternate embodiment, IQ equalizer 218 may be selectively connectable to either the real channel 250 or to the imaginary channel 252 at any given time (e.g., one or more switching elements (not illustrated) may be included that enable IQ equalizer 218 to be connected to either the real channel 250 or to the imaginary channel 252).

FIG. 2 illustrates the IQ imbalance correction system 201 configured in a pass-through mode, in which samples present on the real and imaginary channels 250, 252 are processed by IQ equalizer 218 and IQ balancer 220. As mentioned above, IQ imbalance correction system 201 alternatively may be configured in a bypass mode (e.g., during performance of a calibration procedure). According to an embodiment, the IQ imbalance correction system 201 may be configured into the bypass mode through the manipulation of the mode select switching network 203.

FIG. 3 illustrates a simplified block diagram of transceiver 200 with the IQ imbalance correction system 201 configured in a bypass mode, in accordance with an example embodiment. When configured in the bypass mode, the IQ equalizer 218 is bypassed, and the samples present on both the real channel 250 and the imaginary channel 252 are provided directly to IQ balancer 220. Alternatively, referring again to FIG. 2, when configured in the pass-through mode, the samples present on the real channel 250 and the imaginary channel 252 are provided to IQ balancer 220 through IQ equalizer 218.

According to an embodiment, IQ equalizer 218 may include an n-tap finite impulse response (FIR) filter having n programmable, real coefficients. According to a more particular embodiment, the number of filter taps may equal four, although IQ equalizer 218 may include a filter having more (e.g., 6, 8, 10, 12 or more) or fewer (e.g., 2) taps, in other embodiments. The values of the n programmable, real coefficients corresponding to the n taps are determined by calibration subsystem 206 during a calibration procedure, which will be described later. The coefficients may be stored in one or more registers (e.g., n "filter coefficient registers") that are accessible by IQ equalizer 218. According to an embodiment, the coefficients are determined so that IQ equalizer 218 will function as a nonlinear-phase filter, which will equalize both the amplitude and phase parts of the frequency-dependent component of the IQ imbalance. The equalization is performed, in an embodiment, at n (e.g., four) offset frequencies. According to an embodiment, the four offset frequencies include two offset frequencies above a carrier frequency, and two additional offset frequencies located below the carrier frequency, where the additional offset frequencies located below the carrier frequency are symmetrical with the two offset frequencies above the carrier frequency. In other embodiments, equalization may be performed at more or fewer offset frequencies, and/or the offset frequencies may be asymmetrically located on either side of the carrier frequency.

According to an embodiment, the output of IQ equalizer 218 is connected to IQ balancer 220 in the pass-through mode, and the channel (e.g., channel 250) that is not connectable through equalizer 218 is connectable directly to IQ balancer 220. IQ balancer 220 is adapted to compensate for offset frequency-independent components of transmitter IQ imbalance by applying IQ gain correction and IQ phase correction to the samples present on the real and imaginary channels 250, 252, according to an embodiment. The IQ gain correction may be represented by an IQ gain correction value, and the IQ phase correction may be represented by an IQ phase correction value, according to an embodiment. The IQ gain correction value and the IQ phase correction value are determined by calibration subsystem 206 during a calibration procedure, which will be described later, and these values may be stored in one or more registers (e.g., an IQ gain correction value register and an IQ phase correction value register) that are accessible by IQ balancer 220.

According to a first embodiment, IQ balancer 220 includes a set of multipliers and combiners, which are adapted to perform the following operations: 1) multiply the sample present on the real input channel 266 with a transmit IQ phase correction value to produce a phase-corrected real component; 2) subtract the phase-corrected real component from the sample present on the imaginary input channel 268 to produce a balanced imaginary sample 272; and 3) multiply the sample present on the real input channel 266 with a transmit IQ amplitude correction value to produce a balanced real sample 270. According to an alternate embodiment, IQ balancer 220 includes a set of multipliers and combiners, which are adapted to perform the following alternative operations: 1) multiply the sample present on the imaginary input channel 268 with a transmit IQ phase correction value to produce a phase-corrected imaginary component; 2) subtract the phase-corrected imaginary component from the sample present on the real input channel 266 to produce the balanced real sample 270; and 3) multiply the sample present on the imaginary input channel 268 with a transmit IQ amplitude correction value to produce the balanced imaginary sample 272.

The balanced real and imaginary samples 270, 272 are provided to the power control module 222. Power control module 222 is adapted to apply gains to the received samples (e.g., to the balanced real and imaginary samples 270, 272) in order to pre-distort the received samples in a manner that mitigates gain application inaccuracies and/or non-linear distortion.

Up-sampler 224 is adapted to up-sample the power adjusted samples 274 to or toward a sampling rate supported by DACs 226, 228. For example, up-sampler 224 may up-sample the power adjusted samples 274 at a ratio of about 48:1 (e.g., for GMSK or EDGE), 96:1 (e.g., for WCDMA), or in a range of about 24:1 to 192:1 (e.g., for LTE), although up-sampler 224 may up-sample the power adjusted samples at lower, higher or different ratios, in other embodiments. DACs 226, 228 perform a digital-to-analog conversion of the up-sampled samples 278, to produce a first analog signal 280 corresponding to the real channel, and a second analog signal 282 corresponding to the imaginary channel. According to an embodiment, first analog signal 280 may be produced at rates in a GSM range (e.g., between about 0 kHz to about 100 kHz), an EDGE range (e.g., between about −100 to +100 kilohertz kHz), in a WCDMA range (e.g., between about −1.92 to +1.92 MHz) or in an LTE range (e.g., from a minimum of about −0.7 MHz to +0.7 MHz and a maximum of about −10 to +10 MHz), although first analog signal 280 may be produced at lower or higher rates, in other embodiments.

Baseband filters (BBF) 230, 232 are adapted to filter the first and second analog signals 280, 282 in order to attenuate out-of-band components, according to an embodiment. Modulator 234 receives, up-converts, and modulates the filtered analog signals 284, 286 in order to generate an analog RF transmit signal 288 (e.g., signal 132, FIG. 1). In an embodiment, modulator 234 implements an OFDM type of digital, multi-carrier modulation technique. Accordingly, RF transmit signal 288 may include signal components on a plurality of modulated, orthogonal sub-carriers that are located at various offset frequencies on both sides of an RF carrier frequency. Each sub-carrier may convey one of a plurality of data streams that are generated from the filtered analog signals 284, 286. According to an embodiment, modulator 234 generates RF transmit signal 288 at frequencies within a range of about 2500 MHz to about 2690 MHz. In alternate embodiments, modulator 234 may generate RF transmit signal 288 at frequencies within different frequency ranges, such as 806-960 MHz, 1710-2025 MHz, and/or 2110-2200 MHz. In other embodiments, modulation techniques other than OFDM may be employed (e.g., other multi-carrier modulation techniques and/or single-carrier modulation techniques), and/or modulation at frequencies above or below the above-given ranges may be performed.

During normal data transmissions (e.g., at times when a calibration procedure is not being performed), and as discussed previously in conjunction with FIG. 1, the analog RF transmit signal 288 may then be filtered (e.g., by RF TX filter 106, FIG. 1), amplified (e.g., by amplifier 110, FIG. 1), and radiated onto the air interface (e.g., by antenna 116, FIG. 1). As also discussed previously, the antenna (e.g., antenna 116, FIG. 1) also may receive RF signals present on the air interface, and those received signals may be filtered (e.g., by RF RX filter 108, FIG. 1), and provided to the receiver lineup 204. Alternatively, at times when a calibration procedure is being performed, and as will be described in more detail later, receiver lineup 240 may be provided instead with a representation of the RF transmit signal 288 through feedback path 236.

Receiver lineup 204 includes a low noise amplifier (LNA) 290, a demodulator 292, baseband filters (BBF) 294, 296, and analog-to-digital converters (ADC) 298, 300, according to an embodiment. LNA 290 receives the filtered, RF receive signal 310 (e.g., filtered, RF receive signal 142, FIG. 1) or a representation of the RF transmit signal 288 provided through feedback path 236, and amplifies the signal to a desired power level. Demodulator 292 receives the amplified RF receive signal 312, and down-converts the signal to baseband, according to an embodiment. During the demodulation process, the signal is separated into a first analog signal 314 corresponding to a real channel, and a second analog signal 316 corresponding to an imaginary channel. BBFs 294, 296 are adapted to filter the first and second analog signals 314, 316 in order to attenuate out-of-band components, according to an embodiment. Finally, ADCs 298, 300 are adapted to perform an analog-to-digital conversion of the filtered analog signals 318, 320, in order to produce a sequence of baseband, digital receive samples 322 (e.g., baseband, digital receive signal 144, FIG. 1). According to an embodiment, the baseband, digital receive samples 322 each have a real part and an imaginary part, which are produced in parallel.

As mentioned above, IQ equalizer 218 compensates for offset-frequency-dependent components of transmitter IQ imbalance by performing an equalization procedure that uses a plurality of programmable filter coefficients (e.g., four coefficients), and IQ balancer compensates for offset-frequency-independent components of transmitter IQ imbalance by applying an IQ gain correction value and an IQ phase correction value to the baseband samples. According to an embodiment, calibration subsystem 206 is adapted to determine the programmable filter coefficients, the IQ gain correction value, and the IQ phase correction value during a calibration procedure. When the programmable filter coefficients, the IQ gain correction value, and the IQ phase correction value are set to values that provide adequate correction of transmit IQ imbalances (e.g., acceptable image rejection at all offset frequencies within the operational bandwidth), then the IQ equalizer 218 and the IQ balancer 220 are considered to be "calibrated." Alternatively, when the programmable filter coefficients, the IQ gain correction value, and/or the IQ phase correction value have become obsolete and/or are set to values that do not provide adequate correction of transmit IQ imbalances, then the IQ equalizer 218 and the IQ balancer 220 are considered to be "uncalibrated."

According to an embodiment, a calibration procedure may be performed in response to the receipt of a calibration initiation signal 330, which may originate from other portions of the system (e.g., from baseband processing subsystem 102, FIG. 1). For example, a calibration initiation signal 330 may be provided, and thus a calibration procedure may be performed, when a device initially is powered up (e.g., "cold" calibration). According to another embodiment, a calibration initiation signal 330 may be provided when a determination is made that an ambient temperature is outside a given range (e.g., "warm" calibration). The temperature determination may be made based on information provided by a temperature sensor incorporated in the device, and/or based on information from an external source. The temperature range may be defined by a low temperature threshold (e.g., −30 degrees Celsius) and a high temperature threshold (e.g., +85 degrees Celsius), and the calibration initiation signal 330 may be provided when the ambient temperature is below the low temperature threshold and/or above the high temperature threshold. In yet another embodiment, a calibration initiation signal 330 may be provided when a determination is made that the device has switched configurations (e.g., between LTE, EDGE, GSM, and W-CDMA), when the device has been moved to and/or activated within a different country, and/or when the device has been assigned to communicate in a different bandwidth or at a different carrier frequency (e.g., "on-demand" calibration). In addition or alternatively, a calibration initiation signal 330 may be provided at times when it is determined that the transmitter lineup 202 and receiver lineup 204 are not imminently needed for processing data-bearing signals, and/or when other operational or environmental parameters have changed by amounts that may have caused previously determined filter coefficients, IQ gain correction value, and IQ phase correction value to become obsolete. In addition or alternatively, a calibration initiation signal 330 may be provided at times when it is determined that the IQ equalizer 218 and the IQ balancer 220 are uncalibrated (e.g., when feedback measurements indicate phase and/or amplitude IQ imbalances above threshold values).

Figure 4:
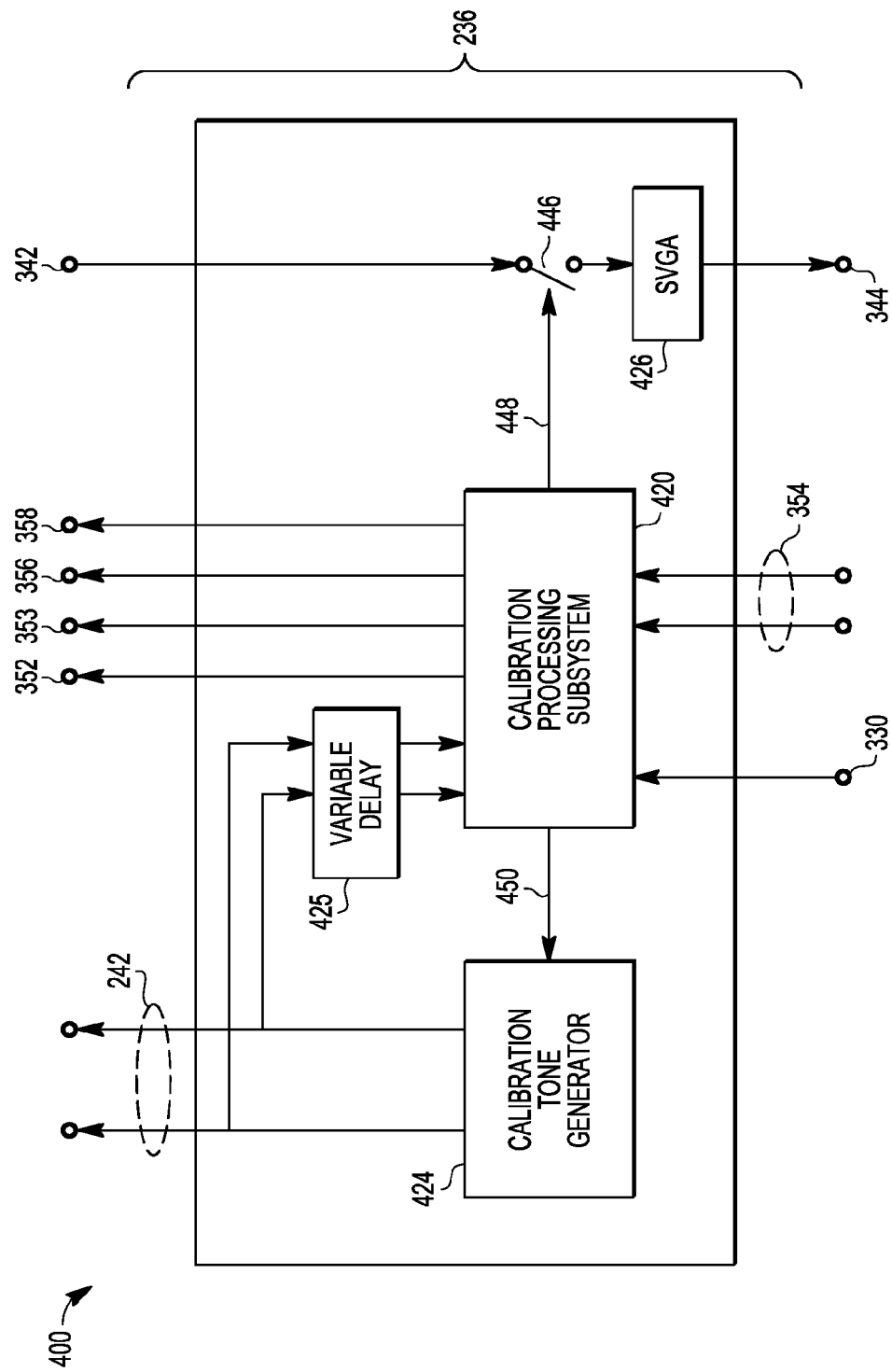
FIG. 4 illustrates a simplified block diagram of calibration subsystem, in accordance with an example embodiment.

FIG. 4 illustrates a simplified block diagram of calibration subsystem 400 (e.g., calibration subsystem 206, FIG. 2), in accordance with an example embodiment. Calibration system 400 is adapted to initiate and control a calibration procedure, as mentioned above (e.g., at certain times when data-bearing signals are not being processed). Calibration system 400 includes a calibration processing subsystem 420, a calibration tone generator 424, variable delay block 425, and a feedback path 236 that includes a stepped variable gain amplifier (SVGA) 426. Referring to FIGS. 2-4 together, calibration processing subsystem 420 is adapted to perform a calibration procedure in response to a calibration initiation signal 330. According to an embodiment, and as will be described in more detail in conjunction with FIGS. 5-9, calibration processing subsystem 420 is adapted to perform the calibration procedure by enabling feedback path 236 to receive an input feedback signal 342 (e.g., analog RF transmit signal 288, FIG. 2) from the output of the transmitter lineup (e.g., from modulator 234 of transmitter lineup 202, FIG. 2), and to convey an output feedback signal 344 to the input of the receiver lineup (e.g., to LNA 290 of receiver lineup 204, FIG. 2). Feedback path 236 includes a switch 446 and SVGA 426, in an embodiment, and calibration processing subsystem 420 is adapted to enable feedback path 236 by providing a control signal 448 to switch 446, which causes switch 446 to close. Similarly, calibration processing subsystem 420 is adapted to disable feedback path 236 by providing a control signal 448 to switch 446, which causes switch 446 to open.

As will be described in more detail in conjunction with FIG. 5, once the feedback path 236 is enabled, calibration processing subsystem 420 may control the configuration of the transmitter lineup (e.g., transmitter lineup 202, FIG. 2), determine a transmit IQ gain correction value and a transmit IQ phase correction value for IQ balancer 220, and determine filter coefficients for IQ equalizer 218. During the times when calibration processing subsystem is determining the transmit IQ gain correction value, the transmit IQ phase correction value, and the filter coefficients, calibration processing subsystem 420 may provide configuration control signals 352 (e.g., to mode select switching network 203, FIG. 2), which cause the IQ imbalance correction system 201 to be configured in a bypass mode (e.g., the configuration illustrated in FIG. 3).

Upon setting the IQ imbalance correction system 201 in the bypass mode, calibration processing subsystem 420 may provide a tone generation control signal 450 to calibration tone generator 424, which causes calibration tone generator 424 to produce a calibration tone in the form of a sequence of digital calibration tone samples 242. Each calibration tone sample 242 may be represented as $I_{TX}[n]+j*Q_{TX}[n]$, where j=sqrt(−1), $I_{TX}[n]$ is a real component of the nth sample, and $Q_{TX}[n]$ is an imaginary component of the nth sample. According to an embodiment, the calibration tone samples 242 may represent, for example, a pure complex tone generated at a calibration tone frequency, $F_{CAL}$, and the calibration tone frequency may be specified in the tone generation control signal 450 According to alternate embodiments, the calibration tone samples may represent a different type of tone that produces an orthogonal, I, Q sample stream.

During times when calibration processing subsystem 420 is determining the IQ gain and phase correction values for use by IQ balancer 220, calibration processing subsystem 420 may cause calibration tone generator 424 to produce calibration tone samples 242 corresponding to a calibration tone at a transmit carrier frequency currently assigned to the device. Alternatively, during times when calibration processing subsystem 420 is determining a filter coefficient for use by IQ equalizer 218, calibration processing subsystem 420 may cause calibration tone generator 424 to produce calibration tone samples 242 corresponding to a plurality of calibration tones (e.g., n/2 calibration tones, where n is the number of taps in the n-tap filter implemented in IQ equalizer 218). The plurality of calibration tones are produced sequentially, according to an embodiment, and each calibration tone corresponds to a sub-carrier frequency (e.g., one of n/2 sub-carrier frequencies that are offset from a transmit carrier frequency). The sub-carrier frequencies used for a particular set of filter coefficients may have frequency offsets from the carrier frequency that are relatively small (e.g., from 50 to 250 kHz), according to an embodiment, although sub-carrier frequencies having offsets that are relatively large also or alternatively may be used, according to other embodiments.

Once the system is configured to perform the calibration procedure (e.g., feedback path 236 is enabled and the IQ imbalance correction system 201 is set in the bypass mode), the calibration tone samples 242 and the signals derived therefrom may be processed through the transmitter lineup 202, the feedback path 236, and the receiver lineup 204. To initiate such processing, calibration processing subsystem 420 (or some other system component) may provide a select signal 353 to MUX 210 (FIG. 2), to cause MUX 210 to selectively output the calibration tone samples 242 (e.g., rather than the digital input samples 240, FIG. 2). The calibration tone samples 242 are then processed by filter 212 and PAR adjust module 214, as discussed previously, in order to produce complex, PAR-adjusted digital samples 248.

As mentioned previously, complex rotator 216 (FIG. 2), if included in the system, is bypassed at times when a calibration procedure is not being performed. During times when the calibration procedure is being performed, however, complex rotator 216 receives and rotates PAR-adjusted digital samples 248, in order to produce rotated samples on the real and imaginary channels 250, 252 (FIG. 2). In order to enable complex rotator 216, calibration processing subsystem 420 (or some other system component) also may provide a rotator control signal (not illustrated), to cause complex rotator 216 to apply a rotation to the complex, PAR-adjusted digital samples 248. According to an embodiment, the rotation is applied in an opposite direction from and by substantially a same angle as an estimated rotation that will be applied between modulator 234 and demodulator 262 along the feedback path 236. As mentioned previously, complex rotator 216 may be excluded from the system, in an alternate embodiment. Because the IQ imbalance correction system 201 is configured in the bypass mode during the calibration procedure, the IQ equalizer 218 is bypassed, and the samples present on the real and imaginary channels 250, 252 are provided directly to IQ balancer 220. IQ balancer 220 compensates for offset frequency-independent components of transmitter IQ imbalance by applying the then-current IQ gain correction and IQ phase correction to the samples present on the real and imaginary channels 250, 252. The balanced real and imaginary samples 270, 272 are provided to power control module 222. The samples are thereafter processed, converted to analog, and modulated as described in conjunction with FIG. 2, in order to produce RF transmit signal 288.

With the feedback path 236 enabled (e.g., with switch 446 closed), a representation of the RF transmit signal 288 is provided as the input feedback signal 342 to SVGA 426. SVGA 426 attenuates the input feedback signal 342 in order to generate output feedback signal 344. The output feedback signal 344 is received and processed by the receiver lineup 204 (FIG. 2), as described above, in order to produce a sequence of baseband, digital receive samples 322. The baseband, digital receive samples 322 are provided as baseband feedback samples 354 to calibration processing subsystem 420. Each baseband feedback sample 242 may be represented as $I_{RX}[n]+j*Q_{RX}[n]$, where $I_{RX}[n]$ is a real component of the nth feedback sample, and $Q_{RX}[n]$ is an imaginary component of the nth feedback sample.

As will be described in more detail in conjunction with FIGS. 5-9, for a calibration tone that is generated in conjunction with determining the transmit IQ gain and phase correction values, calibration processing subsystem 420 processes a time-aligned version of the calibration tone samples 242 and the baseband feedback samples 354 in order to determine the transmit IQ gain correction value and the transmit IQ phase correction value. Similarly, for a calibration tone that is generated in conjunction with determining one of the multiple filter coefficients, calibration processing subsystem 420 processes a time-aligned version of the calibration tone samples 242 and the baseband feedback samples 354 in order to determine the filter coefficient. Time-alignment of the calibration tone samples 242 and the baseband feedback samples 354 may be performed by a variable delay element 425, which is included between the output of the calibration tone generator 424 and the calibration processing subsystem 420. According to an embodiment, the feedback path roundtrip latency may be determined through a delay calibration procedure (not described in detail herein), and the variable delay element 425 may be configured to delay the calibration tone samples 242 by a number of clock cycles that corresponds to the roundtrip latency, in order to produce the time-aligned version of the calibration tone samples 242.

As indicated previously, different calibration tones are generated, processed by the transmitter lineup 202, fed back through the feedback path 236, processed by the receiver lineup 204, and evaluated by the calibration processing subsystem 420 for the filter coefficients and for the transmit IQ gain and phase correction values. Once the filter coefficients and the transmit IQ gain and phase correction values are calculated (as described in more detail later in conjunction with FIGS. 4-9), a signal 356 conveying the filter coefficients is provided to the filter coefficient registers associated with the IQ equalizer 218, and a signal 358 conveying the transmit IQ gain and phase correction values is provided to the transmit IQ gain and phase correction value registers associated with the IQ balancer 220.

Upon completion of the calibration procedure, calibration processing subsystem 420 may provide select signal 353 to MUX 210 (FIG. 2), to cause MUX 210 to selectively output the digital input samples 240 (e.g., rather than the calibration tone samples 242). In addition, calibration processing subsystem 420 may provide a control signal 448 to switch 446, which causes switch 446 to open, thus disabling the feedback path 236. Finally, calibration processing subsystem 420 may provide configuration control signals 352 to cause IQ imbalance correction system 201 to be configured in a pass-through mode (e.g., the configuration illustrated in FIG. 2). Calibration processing subsystem 420 also may provide a control signal (not illustrated) to another system component (e.g., to baseband processing subsystem 102), which indicates that calibration processing subsystem 420 has completed the calibration procedure (e.g., calibration processing subsystem 420 has completed its calculation of the filter coefficients and the IQ gain and phase correction values). Once the IQ imbalance correction system 201 has been set into the pass-through mode and the feedback path 236 has been disabled, the transmitter lineup 202 and the receiver lineup 204 may then process incoming signals as described previously in conjunction with FIG. 2.

Figure 5:
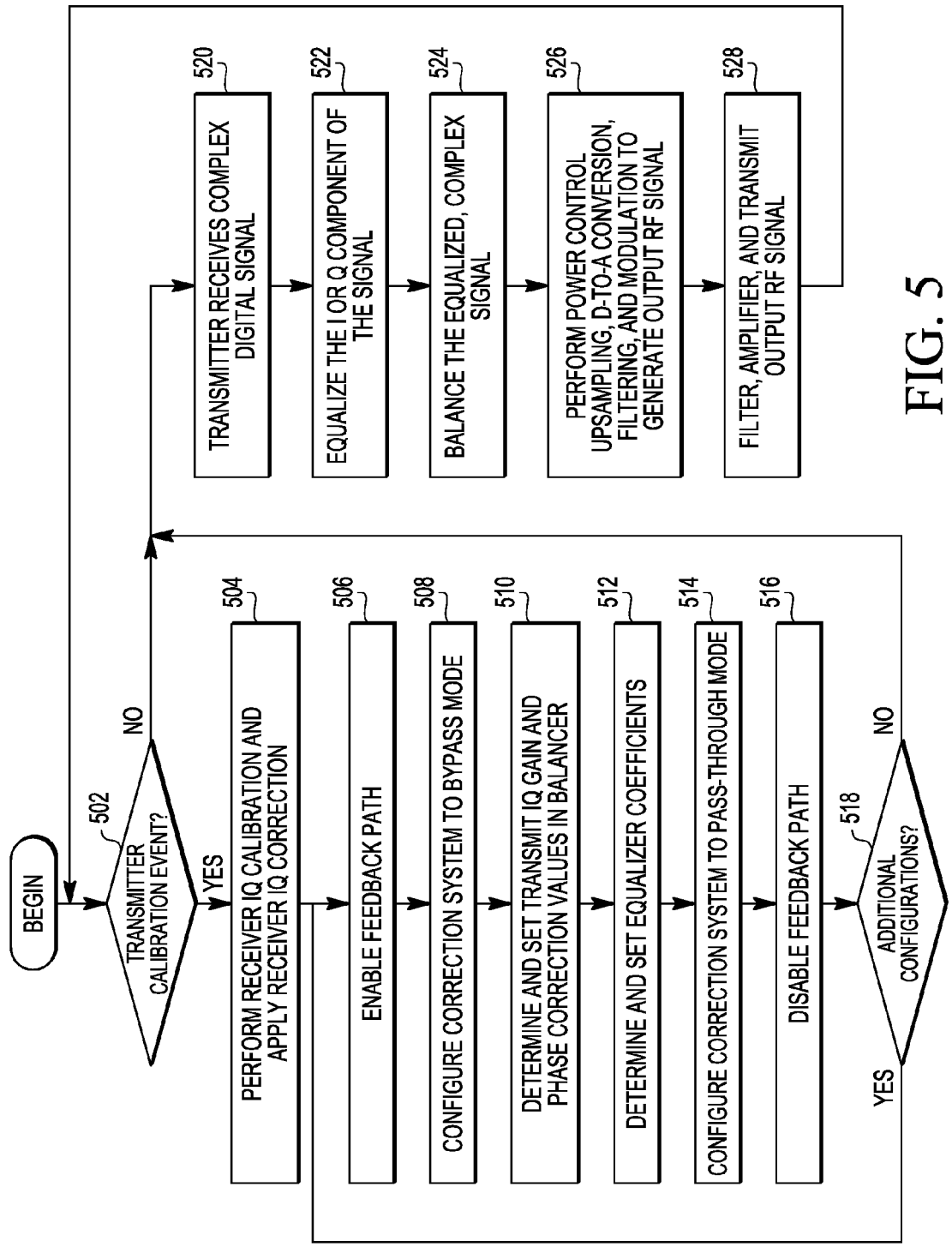
FIG. 5 illustrates a flowchart of a method for performing calibration and IQ imbalance correction, according to an example embodiment.

FIG. 5 illustrates a flowchart of a method for performing calibration and IQ imbalance correction, according to an example embodiment. Portions of the method may be performed by various system components and subsystems, described previously, and accordingly the description of the method embodiments, below, will refer to various elements of FIGS. 1-4. It is to be understood that, in other embodiments, system components that are different from those indicated below may perform various portions of the method. Accordingly, the description below is not meant to limit portions of the method to being performed by specific system components or subsystems.

The method may begin, in block 502, by determining (e.g., by calibration processing subsystem 420, FIG. 4) whether a transmitter lineup calibration event has occurred. As indicated previously, a transmitter lineup calibration event may include one or more events selected from a group of events that includes a device power up event, a determination being made that an ambient temperature is outside a given range, a determination that the device has switched configurations, a determination being made that the device has been moved to and/or activated within a different country, a determination being made that the device has been assigned to communicate in a different bandwidth or at a different carrier frequency, a determination being made that one or more operational or environmental parameters have changed by amounts that may have caused previously determined filter coefficients, IQ gain correction value, and IQ phase correction value to become obsolete, and/or a determination being made that the IQ equalizer 218 and/or the IQ balancer 220 have become uncalibrated. A transmitter lineup calibration event may be indicated, for example, by providing a calibration initiation signal (e.g., by baseband processing subsystem 102 providing signal 330, FIGS. 1-4).

When a transmitter lineup calibration event has occurred, then in block 504, a receiver IQ calibration process may be performed. Receiver IQ calibration may be performed in using a number of different known or new techniques, which are not discussed herein for the purpose of brevity. In an alternate embodiment, or at various times, the receiver IQ calibration process may be bypassed.

After completing or bypassing the receiver IQ calibration process, a transmitter IQ calibration process may be performed in blocks 506, 508, 510, 512, 514, and 516. More specifically, in block 506, a feedback path (e.g., feedback path 236, FIGS. 2 and 4) may be enabled in order to provide a path between the output of the transmitter lineup (e.g., transmitter lineup 202, FIG. 2) and the input of the receiver lineup (e.g., receiver lineup 204, FIG. 2). According to an embodiment, the feedback path may be enabled by providing a control signal (e.g., control signal 448 provided by calibration processing subsystem 420, FIG. 4) to cause a switch (e.g., switch 446, FIG. 4) in the feedback path to close, thus interconnecting the transmitter lineup output and the receiver lineup input.

In block 508, the IQ imbalance correction system (e.g., IQ imbalance correction system 201, FIG. 2) may be configured into a bypass mode (e.g., the configuration illustrated in FIG. 3). For example, calibration processing subsystem 420 (or some other system component) may provide a configuration control signal 352, which causes the IQ imbalance correction system 201 to be configured in a bypass mode, in an embodiment.

In block 510, the transmit IQ gain correction value and the transmit IQ phase correction value may then be determined and "set" (e.g., stored in registers accessible to IQ balancer 220). Although determining the transmit IQ gain and phase correction values will be described in more detail in conjunction with FIG. 6, the process essentially may include generating a calibration tone (e.g., calibration tone generator 424 generating a calibration tone signal 242 at an assigned carrier frequency), processing the calibration tone through the transmitter lineup 202, feeding back the output of the transmitter lineup to the input of the receiver lineup (e.g., through feedback path 236), processing the fed back signal through the receiver lineup 204, comparing the resulting signal with a time-aligned version of the calibration tone in order to determine the transmit IQ gain and phase correction values (e.g., by calibration processing subsystem 420), and storing the determined values in the transmit IQ gain and phase correction value registers associated with the IQ balancer 220.

In block 512, the n filter coefficient values for the IQ equalizer 218 may then be determined and "set" (e.g., stored in registers accessible to IQ equalizer 218). Although determining the equalizer filter coefficients will be described in more detail in conjunction with FIG. 9, the process essentially may include, for each filter coefficient being determined, generating (e.g., by calibration tone generator 424) a plurality of calibration tones (e.g., n/2 calibration tones, where n is the number of taps implemented in the n-tap filter of IQ equalizer 218)), processing each calibration tone through the transmitter lineup 202, feeding back the output of the transmitter lineup to the input of the receiver lineup (e.g., through feedback path 236), processing the fed back signal through the receiver lineup 204, comparing the resulting signals with time-aligned versions of the calibration tones in order to determine the filter coefficients (e.g., by calibration processing subsystem 420), and storing the determined filter coefficients in the filter coefficient registers associated with the IQ equalizer 218.

In block 514, the IQ imbalance correction system (e.g., IQ imbalance correction system 201, FIG. 2) may be configured into a pass-through mode (e.g., the configuration illustrated in FIG. 2). For example, calibration processing subsystem 420 (or some other system component) may provide a configuration control signal 352, which causes IQ imbalance correction system 201 to be configured in the pass-through mode, in an embodiment. In addition, in block 516, the feedback path (e.g., feedback path 236, FIGS. 2 and 4) may be disabled in order to disconnect the output of the transmitter lineup (e.g., transmitter lineup 202, FIG. 2) and the input of the receiver lineup (e.g., receiver lineup 204, FIG. 2). According to an embodiment, the feedback path may be disabled by providing a control signal (e.g., control signal 448 provided by calibration processing subsystem 420, FIG. 4) to cause a switch (e.g., switch 446, FIG. 4) in the feedback path to open, thus disconnecting the transmitter lineup output and the receiver lineup input.

In block 518, a determination may be made whether a calibration procedure should be performed for one or more other configurations. For example, an embodiment may be implemented in a multi-mode system in which a plurality of different wireless telephone technologies and/or transmission bandwidths are supported, and/or in which the transmitter IQ imbalance is dependent on factors such as the baseband filter corner frequency, the SVGA type, and so on. In such systems, it may be desirable to perform a calibration procedure for each configuration (e.g., for GSM, EDGE, W-CDMA, and/or LTE). When a determination is made that a calibration procedure should be performed for one or more other configurations, then the method may again perform the calibration procedure (e.g., blocks 506-516) for each of the one or more other configurations. When a calibration procedure has been performed for each configuration of interest, then the transceiver may enter a data-bearing signal processing mode, in which the transmitter lineup 202 and the receiver lineup 204 each process data-bearing signals. A simplified description of a method for a transmitter lineup to process data-bearing signals is depicted in blocks 520, 522, 524, 526, and 528. For purposes of brevity, a method for a receiver lineup to process data-bearing signals is not depicted or described in detail.

In block 520, the transmitter lineup 202 receives digital input samples (e.g., digital input samples 240, FIG. 2, from baseband processing subsystem 102, FIG. 1). These samples may be passed (e.g., by MUX 210) to a pulse shaping filter (e.g., pulse shaping filter 212), which implements a pulse shaping filter to modify the spectral shape of the digital input samples in order to meet the spectral requirements. The ratio of the peak sample power to average sample power may then be adjusted (e.g., by PAR adjust module 214) to the filtered digital samples. As mentioned previously, complex rotator 216, if included, is bypassed when the calibration procedure is not being performed (e.g., during the processing of data-bearing signals). Alternatively, the complex rotator 216 may be configured to apply a zero degree rotation to the PAR-adjusted digital samples at times when data-bearing signals are being processed.

In block 522, the offset frequency-dependent components of transmitter IQ imbalance are compensated for (e.g., by IQ equalizer 218) by performing an equalization procedure to either the real or the imaginary parts of the PAR-adjusted digital samples (e.g., the samples present on either the real channel 250 or the imaginary channel 252), according to an embodiment. As discussed previously, IQ equalization may include applying an n-tap FIR filter having n real coefficients, where the values of the n real coefficients are determined and set (e.g., stored in the filter coefficient registers) during the calibration procedure (e.g., during block 512). In block 524, the equalized samples present on the real and imaginary channels are then balanced (e.g., by IQ balancer 220), in order to compensate for offset frequency-independent components of the transmitter IQ imbalance. As discussed previously, this includes applying an IQ gain correction value and an IQ phase correction value (e.g., values stored in an IQ gain correction value register and an IQ phase correction value register), which are determined during the calibration procedure (e.g., during block 510).

Various processes are then performed, in block 526, to further process the balanced real and imaginary samples (e.g., samples 270, 272, FIG. 2). According to an embodiment, these processes may include performing power control (e.g., e.g., by power control module 222), up-sampling (e.g., by up-sampler 224), digital-to-analog conversion (e.g., by DACs 226, 228), baseband filtering (e.g., by BBFs 230, 232), and modulation (e.g., by modulator 234). In block 528, the resulting analog RF transmit signal (e.g., signal 288) may then be filtered (e.g., by RF TX filter 106, FIG. 1), amplified (e.g., by amplifier 110, FIG. 1), and radiated onto the air interface (e.g., by antenna 116, FIG. 1). The processes associated with blocks 520-528 may be repeatedly performed until another transmitter calibration event occurs (e.g., as determined in block 502), or until some other process occurs that interrupts the processing of the data-bearing signals (e.g., power down of the transceiver).

In the embodiment illustrated in FIG. 5, the transmit IQ gain correction value, the transmit IQ phase correction value, and the equalizer filter coefficients are determined and set (e.g., in blocks 510 and 512) each time a calibration procedure is performed. In alternate embodiments, a calibration procedure may include determining and setting fewer than all of the transmit IQ gain correction value, the transmit IQ phase correction value, and the equalizer filter coefficients. For example, a determination may be made that only the equalizer filter coefficients are uncalibrated, and accordingly the calibration procedure may include determining only the equalizer filter coefficients (and not the transmit IQ gain and/or phase correction values). Alternatively, a determination may be made that only the transmit IQ gain and/or phase correction values are uncalibrated, and accordingly the calibration procedure may include determining only the transmit IQ gain and/or phase correction values (and not the equalizer filter coefficients). Determining and setting the transmit IQ gain and/or phase correction values and the equalizer filter coefficients will now be described in more detail in conjunction with FIGS. 6 and 7.

Figure 6:
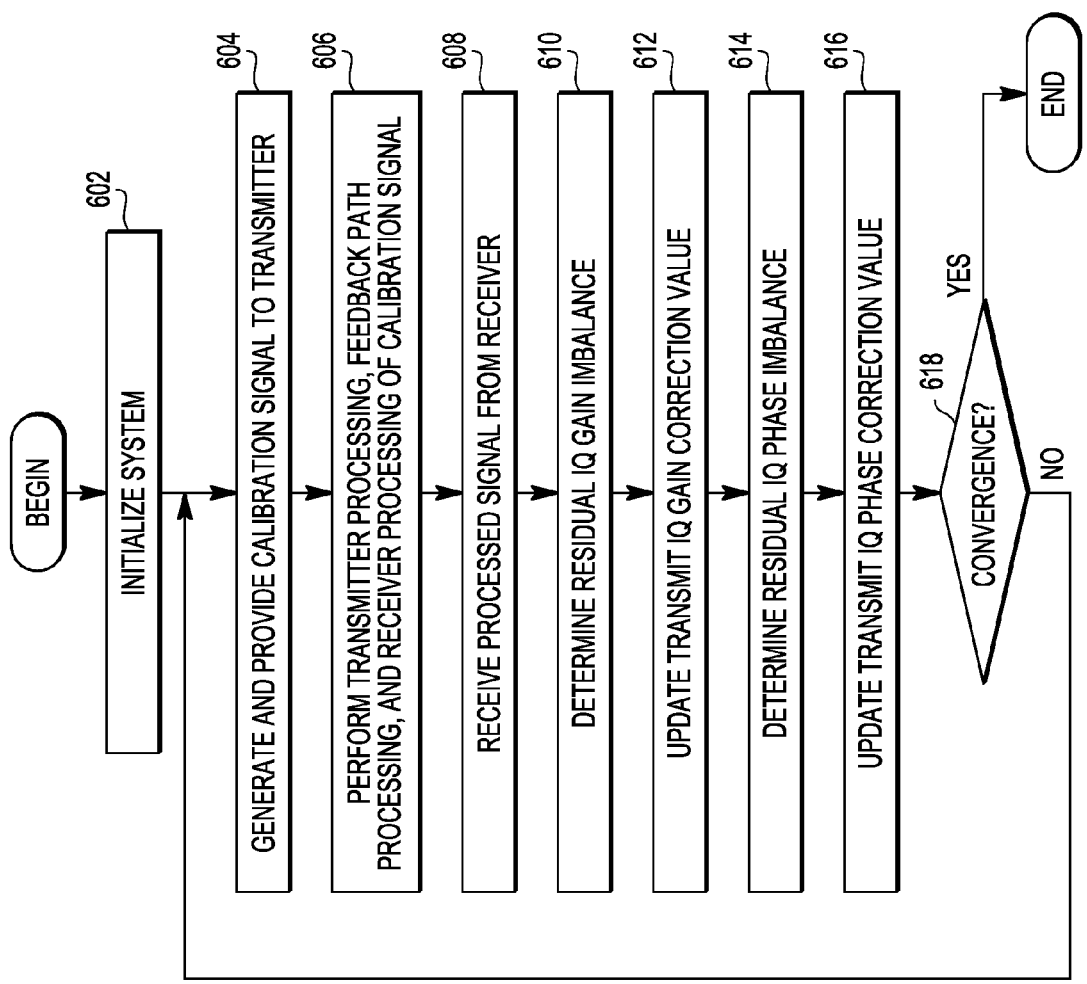
FIG. 6 illustrates a flowchart of a method for determining and setting the transmit IQ gain correction value and the transmit IQ phase correction value, according to an example embodiment.

FIG. 6 illustrates a flowchart of a method for determining and setting the transmit IQ gain correction value and the transmit IQ phase correction value (e.g., block 510, FIG. 5), according to an example embodiment. Determining the transmit IQ gain and phase correction values is performed using an iterative process, in which calibration tones are propagated through the system and analyzed until an error between a time-aligned version of the calibration tone and the fed back signal converges to below a threshold error value.

The method may begin, in block 602, by initializing the system for determination of the transmit IQ gain correction value and the transmit IQ phase correction value. According to an embodiment, unless the following processes already have been performed, this may include enabling the feedback path (e.g., block 506, FIG. 5), configuring the IQ imbalance correction system to bypass mode (e.g., block 508, FIG. 5), configuring the transmitter lineup to process the calibration tone (e.g., by providing select signal 353, FIGS. 2 and 4 to MUX 210, FIG. 2, to cause MUX 210 to provide the calibration tone samples to the transmitter lineup 202), and enabling the complex rotator (e.g., complex rotator 216, FIG. 2), if it is included in the system. In addition, initialization may include setting the transmit IQ phase correction value to an initial value of zero degrees, and setting the transmit IQ gain correction value to an initial value of one (or another value that corresponds to no applied gain).

The method continues, in block 604, by generating and providing a calibration signal (e.g., a calibration tone) to the transmitter lineup (e.g., transmitter lineup 202, FIG. 2). According to an embodiment, this may include providing (e.g., by calibration processing subsystem 420, FIG. 4) a tone generation control signal (e.g., signal 450) to a calibration tone generator (e.g., calibration tone generator 424), which causes the calibration tone generator to produce a calibration tone in the form of a sequence of digital calibration tone samples (e.g., samples 242, FIGS. 2 and 4). According to an embodiment, the calibration tone generator produces a calibration tone at a frequency, F(0), that corresponds to a particular carrier frequency (e.g., the carrier frequency currently assigned to the device).

In block 606, the calibration tone samples are then processed by the transmitter lineup, and the resulting RF signal (e.g., signal 288, FIG. 2) is passed through the feedback path (e.g., feedback path 236) to the receiver lineup (e.g., receiver lineup 204, FIG. 2), where it is further processed. Processing through the transmitter lineup includes filtering (e.g., by filter 212), performing PAR adjustment (e.g., by PAR adjust module 214), and performing complex rotation (e.g., by complex rotator 216), when a complex rotator is included in the system. The IQ imbalance correction system (e.g., IQ imbalance correction system 201) is set in a bypass mode during the calibration procedure, and accordingly only IQ balancing is performed to produce balanced real and imaginary samples (e.g., the IQ equalizer 218 is bypassed). Power control may then be performed (e.g., by power control module 222, FIG. 2) on the balanced real and imaginary samples (e.g., samples 250, 252, FIG. 2), as well as up-sampling (e.g., by up-sampler 224), digital-to-analog conversion (e.g., by DACs 226, 228), baseband filtering (e.g., by BBFs 230, 232), and modulation (e.g., by modulator 234). The resulting RF signal 288 is fed back through the feedback path (e.g., feedback path 236) to the input of the receiver lineup. Processing through the receiver lineup includes amplifying the fed back signal (e.g., by LNA 290), and performing demodulation (e.g., by demodulator 292), baseband filtering (e.g., by BBFs 294, 296), and analog-to-digital conversion (e.g., by ADCs 298, 300).

In block 608, the processed signal (e.g., baseband feedback samples 354) is received (e.g., by calibration subsystem 206) from the receiver lineup. Although blocks 604, 606, and 608 are shown in sequence, it is to be understood that each of blocks 604, 606, and 608 continue to be performed in parallel with each other throughout the iterative process of determining and updating the transmit IQ gain and phase imbalance correction values.

In blocks 610, 612, 614, 616, and 618, the residual transmit IQ gain imbalance and the residual transmit IQ phase imbalance are determined (e.g., by calibration processing subsystem 420) and updated. This is performed using an iterative process during which the time-aligned calibration tone signals (e.g., samples 242, FIGS. 2 and 4) and the processed signal received from the receiver lineup (e.g., baseband feedback samples 354) are repeatedly produced and evaluated. The "residual" transmit IQ gain or phase imbalance corresponds to the transmit IQ gain or phase imbalance measured during each iteration. Initially, the residual transmit IQ gain and phase imbalance will have maximum values, and these values typically will decrease for each subsequent iteration.

According to an embodiment, during each iteration (e.g., each repetition of blocks 610-618), the residual IQ gain imbalance is determined and corrected for (e.g., in blocks 610 and 612), and after a duration that allows the IQ gain correction to be applied to the calibration tone signal, and for the gain corrected signal to be propagated through the remainder of the transmitter lineup, the feedback path, and the receiver lineup, then the residual IQ phase imbalance is determined and corrected for (e.g., in blocks 614 and 616). After a duration that allows the IQ phase correction to be applied to the calibration tone signal, and for the phase (and gain) corrected signal to be propagated through the system, the residual IQ gain imbalance again is determined and corrected for (e.g., in blocks 610 and 612). For example, the gain and phase corrections may be staggered in time by a duration that is at least as long as the propagation time of a calibration tone signal through the transmitter lineup, the feedback path, and the receiver lineup. According to an embodiment, the duration is programmable (e.g., in a range of 20 to 100 microseconds, although the duration may be smaller or greater). The amount of time during which the plurality of iterations is performed is referred to as the integration time of the cross-correlator.

During a first iteration of blocks 610 and 612, the transmit IQ gain imbalance is determined and corrected for in the presence of uncorrected transmit IQ phase imbalance (e.g., zero degree correction), according to an embodiment. After the duration, the transmit IQ phase imbalance is then determined and corrected for (e.g., in blocks 614 and 616) in the presence of a once-corrected transmit IQ gain imbalance correction. During each subsequent iteration, the transmit IQ gain imbalance is determined and corrected for in the presence of a smaller residual transmit IQ phase imbalance, and the transmit IQ phase imbalance is determined and corrected for in the presence of a smaller residual transmit IQ gain imbalance. These iterations are repeated until convergence (e.g., as determined in block 618), when the residual transmit IQ gain and phase imbalances drop below a threshold.

Figure 7:
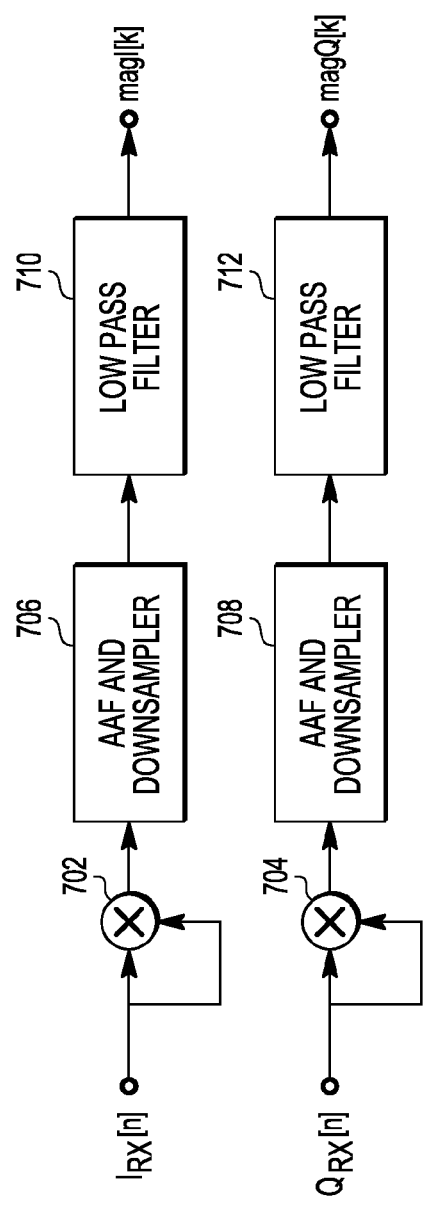
FIG. 7 illustrates a simplified block diagram of various processing components associated with determining a transmit IQ gain imbalance, according to an example embodiment.

The residual transmit IQ gain imbalance is determined in block 610. According to an embodiment, the real and imaginary parts of the baseband feedback signals, $I_{RX}(n)$ and $Q_{RX}(n)$ (e.g., baseband feedback samples 354), are processed along separate channels, each of which may be implemented using substantially identical hardware and/or firmware. FIG. 7 illustrates a simplified block diagram of various processing components associated with determining a transmit IQ gain imbalance, according to an example embodiment. More particularly, these processing components include multipliers 702, 704, anti-aliasing filters (AAF)/downsamplers 706, 708, and low pass filters 710, 712. Referring also to FIG. 6, determining the residual transmit IQ gain imbalance (i.e., block 610) includes first squaring the real and imaginary parts of the baseband feedback samples (e.g., by multipliers 702, 704). The resulting spectrum of the squared real and imaginary samples includes terms at $\{0, +/-F_{CAL}, +/-2*F_{CAL}\}$. It may be undesirable for the $2*F_{CAL}$ terms to be aliased. Thus, according to an embodiment, the squared samples are filtered by anti-aliasing filters (e.g., AAFs 706, 708) in order to eliminate the aliasing of the $2*F_{CAL}$ terms. In addition, a down-sampling process is performed in conjunction with applying each anti-aliasing filter. The process of anti-aliasing and downsampling is performed in three stages, according to an embodiment, using FIR filters that are amenable to multiplier-less implementation. In other embodiments, filtering and downsampling may be performed in fewer or more than three stages, and/or the various filters implemented may implement multiplication functions. A low pass filter (e.g., low pass filters 710, 712, each of which may be an FIR or infinite impulse response (IIR) filter) is then applied to each downsampled product in order to produce the sampled values magI(k) and magQ(k), where k is the sample index, and the samples are produced periodically (e.g., every 50 microseconds, or at some other sampling frequency). According to an embodiment, magI(k) and magQ(k) are sampled only once per update at a discrete time, k=k0.

The transmit IQ gain correction value may be calculated, according to an embodiment, using the following equations:

$$\text{mag\_ratio\_QoverI}[k0]=\text{mag}Q[k]/\text{mag}I[k] \quad \text{(Equation 1)}$$

$$\text{amp\_ratio\_QoverI}[k0]=\text{sqrt}(\text{mag\_ratio\_QoverI}[k0]) \quad \text{(Equation 2)}$$

$$\text{amp\_ratio\_QoverI\_minus1}[k0]=\text{amp\_ratio\_QoverI}[k0]-1.0 \quad \text{(Equation 3)}$$

$$\text{accum\_amp\_corr}[k0]=\text{accum\_amp\_corr}[k0-1]+\text{amp\_ratio\_OoverI\_minus1}[k0] \quad \text{(Equation 4)}$$

As a note, after convergence, there will be IQ-balance, which implies that the energy in the real portion of the signal will approximately equal the energy in the imaginary portion of the signal. This implies that the left hand side of Equation 3, above, will equal approximately 0, upon convergence, and in Equation 4, the accum_amp_corr[k0] term will approximately equal the accum_amp_corr[k0−1] term (e.g., accum_amp_corr[ ] will have converged). Prior to convergence, with theta[k0−1] being the current estimate of IQ phase imbalance (e.g., the current transmit IQ phase imbalance correction value, which initially is zero degrees), then the next transmit IQ gain imbalance correction value may be calculated as follows:

$$\text{IQ gain imbalance correction value}[k0]=\text{accum\_amp\_corr}[k0]*\cos(\text{theta}[k0-1]) \quad \text{(Equation 5)}.$$

In block 612, the transmit IQ gain correction value is updated by storing IQ gain imbalance correction value[k0] in a register that is accessible to the IQ balancer (e.g., IQ balancer 220, FIG. 2).

Figure 8:
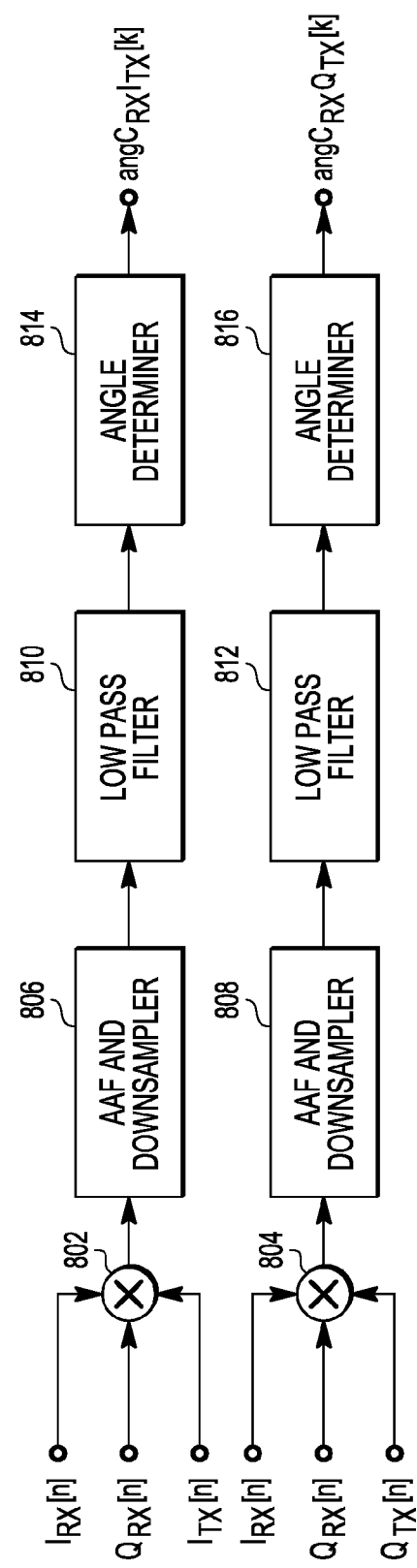
FIG. 8 illustrates a simplified block diagram of various processing components associated with determining a transmit IQ phase imbalance, according to an example embodiment.

After the duration, described above, which allows the updated transmit IQ gain correction value to be applied to the calibration tone samples, and for the signal to be propagated through the remainder of the system, the residual transmit IQ phase imbalance may be determined in block 614. FIG. 8 illustrates a simplified block diagram of various processing components associated with determining a transmit IQ phase imbalance, according to an example embodiment. More particularly, these processing components include multipliers 802, 804, AAF/downsamplers 806, 808, low pass filters 810, 812, and angle determiners 814, 816. According to an embodiment, the same components may be used for multipliers 702 and 802, multipliers 704 and 804, AAF/downsamplers 706, 806, AAF downsamplers 708, 808, low pass filters 710, 810, and/or low pass filters 712, 812, although it is not necessary that the same components be used. Referring also to FIG. 6, determining the residual transmit IQ phase imbalance includes performing a complex multiplication (e.g., by multiplier 802) of the received, complex processed signal, $I_{RX}[n]$ and $Q_{RX}[n]$, with the real portion of the time-aligned calibration tone samples, $I_{TX}[n]$, and also performing a complex multiplication (e.g., by multiplier 804) of the received, complex processed signal, $I_{RX}[n]$ and $Q_{RX}[n]$, with the imaginary portion of the calibration tone samples, $Q_{TX}[n]$. Anti-aliasing filters are applied to the resulting complex products, and the filtered results are then downsampled (e.g., by AAF/downsamplers 806, 808), according to an embodiment. A low pass filter (e.g., low pass filters 810, 812, each of which may be an FIR or infinite impulse response (IIR) filter) is then applied to each downsampled product. The angles of the complex results are determined (e.g., by angle determiners 814, 816) in order to produce $angC_{RX}I_{TX}[k]$ and $angC_{RX}Q_{TX}[k]$, where $angC_{RX}I_{TX}[k]$ represents the angle of the cross-correlation between the complex receive signal $(I_{RX}[\bullet]+jQ_{RX}[\bullet])$ and the real part of the complex transmit signal $I_{TX}[\bullet]$, and $angC_{RX}Q_{TX}[k]$ represents the angle of the cross-correlation between the complex receive signal $(I_{RX}[\bullet]+jQ_{RX}[\bullet])$ and the imaginary part of the complex transmit signal $Q_{TX}[\bullet]$.

The transmit IQ phase correction value may be calculated, according to an embodiment, using the following equations:

$$\text{angle\_}C_{RX}\_I_{TX}[k0]=\text{inverse-tangent}(\text{imag}(C_{RX}\_I_{TX}[k0])/\text{real}(C_{RX}\_I_{TX}[k0])) \quad \text{(Equation 6)}$$

$$\text{angle\_}C_{RX}\_Q_{TX}[k0]=\text{inverse-tangent}(\text{imag}(C_{RX}\_Q_{TX}[k0])/\text{real}(C_{RX}\_Q_{TX}[k0])) \quad \text{(Equation 7)}$$

$$\text{angleDiff}[k0]=\text{angle\_}C_{RX}\_I_{TX}[k0]-\text{angle\_}C_{RX}\_Q_{TX}[k0]+PI/2 \quad \text{(Equation 8)}$$

$$\text{theta}[k0]=\text{theta}[k0-1]+(-1*\text{angleDiff}[k0]) \quad \text{(Equation 9)}$$

As a note, after convergence, the real portion of the signal will be substantially orthogonal to the imaginary portion of the signal. Thus, in Equation 8, the angle_Crx_Itx–angle_Crx_Qtx calculation will equal approximately −90 degrees. Thus, the left hand side of Equation 8 will be approximately 0, and in Equation 9, the theta[k0] term will approximately equal the theta[k0−1] term, which implies that theta[ ] has converged. Prior to convergence, the next transmit IQ phase imbalance correction value may be calculated as tangent(theta[k0]). In block 616, the transmit IQ phase correction value is updated by storing the IQ phase imbalance correction value, tangent (theta[k0]), in a register that is accessible to the IQ balancer (e.g., IQ balancer 220, FIG. 2).

In block 618, a determination is made whether or not convergence has occurred. According to an embodiment, this includes determining whether the residual transmit IQ gain and phase imbalances determined during the previous iteration have dropped below a threshold (e.g., a value close to zero). When convergence has not yet occurred, the process iterates as shown in FIG. 6. When convergence has occurred, the method for determining the transmit IQ gain and phase correction values may end.

Figure 9:
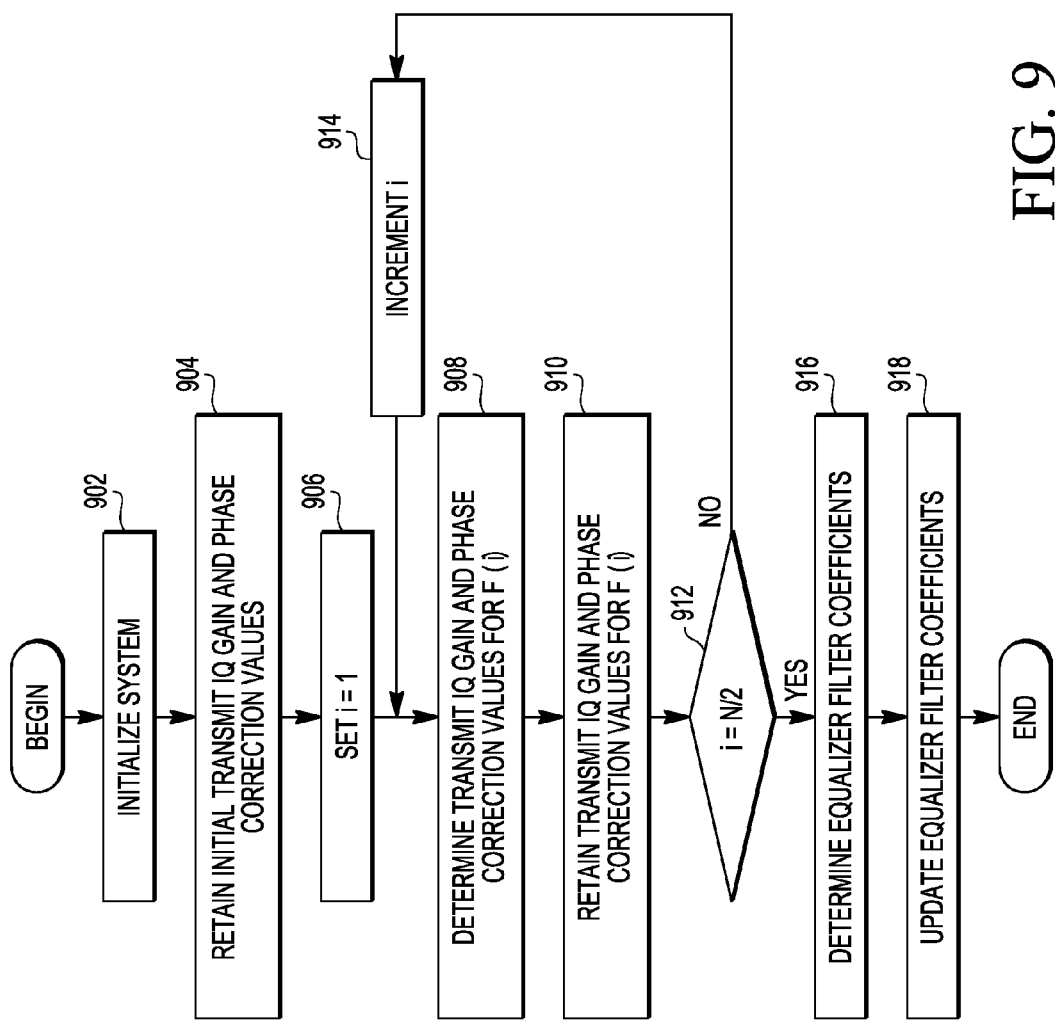
FIG. 9 illustrates a flowchart of a method for determining and setting equalizer filter coefficients, according to an example embodiment.

After the transmitter IQ imbalances are cancelled or compensated for (e.g., block 510 and FIG. 6), the IQ imbalance across the signal band may be measured, and from those measurements the n real filter coefficients for the IQ equalizer (e.g., IQ equalizer 218, FIG. 2) may be determined. FIG. 9 illustrates a flowchart of a method for determining and setting equalizer filter coefficients (e.g., block 512, FIG. 5), according to an example embodiment.

The method may begin, in block 902, by initializing the system for determination of the equalizer filter coefficients. According to an embodiment, unless the following processes already have been performed, this may include enabling the feedback path (e.g., block 506, FIG. 5), configuring the IQ imbalance correction system (e.g., IQ imbalance correction system 201, FIG. 2) to bypass mode (e.g., block 508, FIG. 5), configuring the transmitter lineup to process the calibration tone (e.g., by providing select signal 353, FIGS. 2 and 4 to MUX 210, FIG. 2, to cause MUX 210 to provide the calibration tone samples to the transmitter lineup 202), and enabling the complex rotator (e.g., complex rotator 216, FIG. 2).

In block 904, the transmit IQ gain and phase correction values that were previously determined (e.g., in block 510, FIG. 5, or the process of FIG. 6) are retained as "initial" transmit IQ gain and phase correction values. In block 906, a loop counter, i, is initialized (e.g., to one). The loop counter is implemented to control the number of additional frequencies for which the iterative process of determining and setting the transmit IQ gain and phase correction values (e.g., block 510, FIG. 5, or the process of FIG. 6) will be performed. According to an embodiment in which the IQ equalizer includes n taps (e.g., n=4), the number of additional frequencies for which the iterative process will be performed is equal to n/2 (e.g., 2). In an alternate embodiment, a loop counter may not be implemented, and instead the process may be repeated in a linear manner.

In block 908, transmit IQ gain and phase correction values are determined using the iterative method of FIG. 6 for a calibration tone at an offset frequency, F(i), which corresponds to a non-zero offset frequency with respect to the carrier frequency. This results in a transmit IQ gain correction value, denoted deltaGain(F(i)), and a transmit IQ phase correction value, denoted deltaPhase(F(i)), which values are retained, in block 910, for future analysis.

In block 912, a determination may be made whether the loop counter, i, has a value of n/2, where n equals the number of filter coefficients being calculated. If not, then the loop counter is incremented, in block 914, and the method iterates as shown. More particularly, during the next iteration of block 908, transmit IQ gain and phase correction values are determined for a calibration tone at an offset frequency, F(i), which corresponds to a different, non-zero offset frequency from the offset frequency used during the previous iteration. Accordingly, for example, F(1) is not equal to F(2). The method continues to iterate until transmit IQ gain and phase correction values have been determined for all offset frequencies of interest (e.g., when a determination is made, in block 912, that the loop counter, i, has a value of n/2).

When the transmit IQ gain and phase correction values have been determined for all offset frequencies of interest, then in block 916, the equalizer filter coefficients are determined. As mentioned previously, according to an embodiment, equalization may be performed, at n (e.g., four) offset frequencies, where the offset frequencies include one or more offset frequencies (e.g., F(1) and F(2)) above the carrier frequency, and an equal number of additional offset frequencies (e.g., F(3) and F(4)) symmetrically located below the carrier frequency. According to an example embodiment, in which n=4, for example:

$$F(3)=-F(1);$$

and $$F(4)=-F(2). \quad \text{(Equations 10)}$$

By applying the property of conjugate symmetry of the discrete Fourier transform, an assumption may be made, in such an embodiment, that:

$$\text{deltaGain}(F(3)) = \text{deltaGain}(F(1));$$

$$\text{deltaGain}(F(4)) = \text{deltaGain}(F(2));$$

$$\text{deltaPhase}(F(3)) = -\text{deltaPhase}(F(1));$$

and $$\text{deltaPhase}(F(4)) = -\text{deltaPhase}(F(2)). \quad \text{(Equations 11)}$$

According to an embodiment in which the equalizer filter is a 4-tap filter, the filter implemented in the equalizer (e.g., IQ equalizer 218, FIG. 2) satisfies the following:

$$H(e^{\hat{}}(j2piF(i)/Fsamp)) = \text{deltaGain}(F(i))^* \exp(j^*\text{deltaPhase}(F(i))) \text{ for } i=1, 2, 3, 4, \quad \text{(Equation 12)}$$

where Fsamp is the sampling frequency of the discrete time receive signal ($I_{RX}+j^*Q_{RX}$), which is the same as the sampling frequency of the discrete time transmit signal ($I_{TX}+j^*Q_{TX}$), according to an embodiment.

Accordingly, the four coefficients, c0, c1, c2, and c3 may be obtained as follows:

$$\begin{pmatrix} c0 \\ c1 \\ c2 \\ c3 \end{pmatrix} = \text{inverse} \begin{pmatrix} 1 & e^{-j\omega_0} & e^{-j2\omega_0} & e^{-j3\omega_0} \\ 1 & e^{-j\omega_1} & e^{-j2\omega_1} & e^{-j3\omega_1} \\ 1 & e^{j\omega_1} & e^{j2\omega_1} & e^{j3\omega_1} \\ 1 & e^{j\omega_0} & e^{j2\omega_0} & e^{j3\omega_0} \end{pmatrix} \begin{pmatrix} H(\omega_0) \\ H(\omega_1) \\ \text{conj}(H(\omega_0)) \\ \text{conj}(H(\omega_1)) \end{pmatrix}, \quad \text{(Equation 13)}$$

where $\omega_0$ and $\omega_1$ are discrete time sampling frequencies of the receiver analog-to-digital converters (e.g., ADCs 298, 300, FIG. 2), and wherein $\omega_i = (2 \text{ pi } F(i))/\text{Fsamp}$. According to an embodiment, the matrix of Equation 13 may be pre-computed for each set $\{\omega_0, \omega_1\}$. The nature of the IQ imbalance imposed by the above-described method embodiment is that, after correction of the frequency-independent component of the IQ imbalance (e.g., in block 510, FIG. 5), the residual, complex IQ imbalance is conjugate-symmetric (e.g., the frequency-dependent component of the IQ imbalance at offset frequencies F(1), −F(1) are complex conjugates of each other. In other words, the residual IQ gain and phase imbalances have even and odd symmetry, respectively, about the carrier frequency.

In block 918, the filter coefficients of the IQ equalizer are updated by storing the n filter coefficients determined in block 916 in the filter coefficient registers that are accessible by the IQ equalizer (e.g., IQ equalizer 218, FIG. 2). The method then ends.

It is to be understood that certain ones of the process blocks depicted in FIGS. 5, 6, and 9 may be performed in parallel with each other or with performing other processes. In addition, it is to be understood that the particular ordering of the process blocks depicted in FIGS. 5, 6, and 9 may be modified, while achieving substantially the same result. Accordingly, such modifications are intended to be included within the scope of the inventive subject matter.

Thus, various embodiments of IQ imbalance measurement and correction methods and apparatus have been described. A particular embodiment includes a wireless device having a baseband processing subsystem, a transmitter lineup, a power amplifier, and an antenna. The baseband processing subsystem is adapted to generate a stream of complex, digital baseband samples having real components and imaginary components. The transmitter lineup is adapted to process the real components along a first channel and to process the imaginary components along a second channel in order to produce processed real components and processed imaginary components. The transmitter lineup includes an equalizer and an RF modulator. The equalizer is adapted to perform an equalization procedure to either the processed real components or the processed imaginary components in order to compensate for offset frequency-dependent components of transmitter IQ imbalance, where performing the equalization procedure results in equalized samples. The RF modulator is adapted to receive and to modulate analog versions of the equalized samples, resulting in an analog RF signal. The power amplifier is adapted to amplify the analog RF signal in order to produce an amplified RF signal, and the antenna is adapted to radiate the amplified RF signal onto an air interface.

According to a further embodiment, the wireless device also includes a balancer adapted to apply IQ gain correction and IQ phase correction to the equalized samples in order to compensate for offset frequency-independent components of the transmitter IQ imbalance. According to another further embodiment, the wireless device also includes a calibration tone generator and a calibration processing subsystem. The calibration tone generator is adapted to produce calibration tones in the form of sequences of digital calibration tone samples that are provided to the transmitter lineup as the real components and the imaginary components. The calibration processing subsystem is adapted to perform a calibration procedure by receiving sequences of digital receive samples that represent transmitter and receiver processed versions of the digital calibration tone samples, and processing the digital calibration tone samples and the digital receive samples in order to generate filter coefficients that are utilized by the equalizer during performance of the equalization procedure, and to generate the IQ gain correction value and the IQ phase correction value that are utilized by the balancer during application of the IQ gain correction and the IQ phase correction Another embodiment includes a transceiver that includes a transmitter lineup and a receiver lineup. The transmitter lineup is adapted to process a stream of complex, digital baseband samples that includes real components and imaginary components. The transmitter lineup processes the real components along a first channel and processes the imaginary components along a second channel in order to produce processed real components and processed imaginary components. The transmitter lineup includes an equalizer and an RF modulator. The equalizer is adapted to perform an equalization procedure to either the processed real components or the processed imaginary components in order to compensate for offset frequency-dependent components of transmitter IQ imbalance, where performing the equalization procedure results in equalized samples. The RF modulator is adapted to receive and to modulate analog versions of the equalized samples, resulting in an analog RF signal. The receiver lineup is adapted to receive, demodulate, down-convert, filter, and perform analog-to-digital conversion of the analog RF signal in order to produce digital receive samples.

Yet another embodiment includes a method for performing IQ imbalance correction in a wireless device. The method includes the steps of receiving a stream of complex, digital baseband samples that includes real components and imaginary components, processing the real components along a first channel in order to produce processed real components, processing the imaginary components along a second channel in order to produce processed imaginary components, performing an equalization procedure to either the processed real components or the processed imaginary components in order to compensate for offset frequency-dependent components of transmitter IQ imbalance, where performing the equalization procedure results in equalized samples, and modulating analog versions of the equalized samples, resulting in an analog RF signal.

According to a further embodiment, the method also includes applying IQ gain correction and IQ phase correction to the equalized samples in order to compensate for offset frequency-independent components of the transmitter IQ imbalance. According to another further embodiment, the method also includes producing calibration tones in the form of sequences of digital calibration tone samples, providing the digital calibration tone samples to the transmitter lineup as the real components and the imaginary components, receiving sequences of digital receive samples that represent transmitter and receiver processed versions of the digital calibration tone samples, processing the digital calibration tone samples and the digital receive samples in order to generate filter coefficients that are utilized during performance of the equalization procedure, and processing the digital calibration tone samples and the digital receive samples in order to generate the IQ gain correction value and the IQ phase correction value that are utilized during application of the IQ gain correction and the IQ phase correction.

While the principles of the inventive subject matter have been described above in connection with specific systems, apparatus, and methods, it is to be clearly understood that this description is made only by way of example and not as a limitation on the scope of the inventive subject matter. The various functions or processing blocks discussed herein and illustrated in the Figures may be implemented in hardware, firmware, software or any combination thereof. Further, the phraseology or terminology employed herein is for the purpose of description and not of limitation.

The foregoing description of specific embodiments reveals the general nature of the inventive subject matter sufficiently that others can, by applying current knowledge, readily modify and/or adapt it for various applications without departing from the general concept. Therefore, such adaptations and modifications are within the meaning and range of equivalents of the disclosed embodiments. The inventive subject matter embraces all such alternatives, modifications, equivalents, and variations as fall within the spirit and broad scope of the appended claims.

What is claimed is:

1. An apparatus comprising:
a transmitter lineup adapted to process real components of a stream of complex, digital baseband samples along a first channel and to process imaginary components of the stream of complex, digital baseband samples along a second channel in order to produce processed real components and processed imaginary components, wherein the transmitter lineup includes
an equalizer adapted to perform an equalization procedure to only one of the processed real components or the processed imaginary components in order to compensate for offset frequency-dependent components of transmitter IQ imbalance, wherein performing the equalization procedure results in equalized samples; and
a radio frequency (RF) modulator adapted to receive and to modulate analog versions of the equalized samples, resulting in an analog RF signal.

2. The apparatus of claim 1, wherein the equalizer comprises an n-tap finite impulse response (FIR) filter having n programmable, real coefficients.

3. The apparatus of claim 1, further comprising:
a balancer adapted to apply IQ gain correction and IQ phase correction to the equalized samples in order to compensate for offset frequency-independent components of the transmitter IQ imbalance.

4. The apparatus of claim 3, wherein the balancer is adapted to apply IQ gain correction and IQ phase correction by applying an IQ gain correction value and an IQ phase correction value to the equalized samples.

5. The apparatus of claim 1, further comprising:
a switching network adapted to route the processed real components and the processed imaginary components around the equalizer during a calibration procedure;
a receiver lineup having an input and an output; and
a feedback path adapted to convey the analog RF signal to the input of the receiver lineup, wherein the receiver lineup produces the digital receive samples from the analog RF signal at the output of the receiver lineup.

6. The apparatus of claim 1, further comprising:
a receiver lineup adapted to receive, demodulate, downconvert, filter, and perform analog-to-digital conversion of the analog RF signal in order to produce digital receive samples.

7. The apparatus of claim 1, further comprising:
a baseband processing subsystem adapted to generate the stream of complex, digital baseband samples;
a power amplifier adapted to amplify the analog RF signal in order to produce an amplified RF signal; and
an antenna adapted to radiate the amplified RF signal onto an air interface.

8. The apparatus of claim 1, wherein the apparatus forms at least a portion of a wireless device selected from a group of devices that includes a cellular telephone, a radio, a personal data assistant, a computer, and a mobile internet device.

9. An apparatus comprising:
a transmitter lineup adapted to process real components of a stream of complex, digital baseband samples along a first channel and to process imaginary components of the stream of complex, digital baseband samples along a second channel in order to produce processed real components and processed imaginary components, wherein the transmitter lineup includes
an equalizer adapted to perform an equalization procedure to at least one of the processed real components and the processed imaginary components in order to compensate for offset frequency-dependent components of transmitter IQ imbalance, wherein performing the equalization procedure results in equalized samples, and
a switching network adapted to selectively route the at least one of the processed real components and the processed imaginary components to the equalizer to produce the equalized samples, or to selectively route the at least one of the processed real components and the processed imaginary components around the equalizer to produce non-equalized samples, wherein the switching network is configured to route the at least one of the processed real components and the processed imaginary components around the equalizer during a calibration procedure;

a calibration tone generator adapted to produce calibration tones in the form of sequences of digital calibration tone samples that are provided to the transmitter lineup as the real components and the imaginary components; and a calibration processing subsystem adapted to perform the calibration procedure by receiving the digital calibration tone samples and digital receive samples that represent a transmitter lineup and receiver lineup processed version of equalized samples or the non-equalized samples, and processing the digital calibration tone samples and the digital receive samples in order to generate filter coefficients that are utilized by the equalizer during performance of the equalization procedure.

10. A transceiver comprising:

a transmitter lineup adapted to process a stream of complex, digital baseband samples that includes real components and imaginary components, wherein the transmitter lineup processes the real components along a first channel and processes the imaginary components along a second channel in order to produce processed real components and processed imaginary components, and wherein the transmitter lineup includes
an equalizer adapted to perform an equalization procedure to only one of the processed real components or the processed imaginary components in order to compensate for offset frequency-dependent components of transmitter IQ imbalance, wherein performing the equalization procedure results in equalized samples, and
a radio frequency (RF) modulator adapted to receive and to modulate analog versions of the equalized samples, resulting in an analog RF signal; and a receiver lineup adapted to receive, demodulate, down-convert, filter, and perform analog-to-digital conversion of the analog RF signal in order to produce digital receive samples.

11. The transceiver of claim 10, wherein the transmitter lineup further comprises:

a balancer adapted to apply IQ gain correction and IQ phase correction to the equalized samples in order to compensate for offset frequency-independent components of the transmitter IQ imbalance.

12. The transceiver of claim 10, further comprising:

a calibration tone generator adapted to produce calibration tones in the form of sequences of digital calibration tone samples that are provided to the transmitter lineup as the real components and the imaginary components; and a calibration processing subsystem adapted to perform a calibration procedure by receiving sequences of digital receive samples that represent transmitter and receiver processed versions of the digital calibration tone samples, and processing the digital calibration tone samples and the digital receive samples in order to generate filter coefficients that are utilized by the equalizer during performance of the equalization procedure, and to generate the IQ gain correction value and the IQ phase correction value that are utilized by the balancer during application of the IQ gain correction and the IQ phase correction.

13. The transceiver of claim 12, further comprising:

a switching network adapted to route the processed real components and the processed imaginary components around the equalizer during the calibration procedure; and a feedback path adapted to convey the analog RF signal to an input of the receiver lineup, wherein the receiver lineup produces the digital receive samples from the analog RF signal at an output of the receiver lineup.

14. A method for performing transmit IQ imbalance correction in a wireless device, the method comprising the steps of:

receiving a stream of complex, digital baseband samples that includes real components and imaginary components;

processing the real components along a first channel in order to produce processed real components;

processing the imaginary components along a second channel in order to produce processed imaginary components;

performing an equalization procedure to only one of the processed real components or the processed imaginary components in order to compensate for offset frequency-dependent components of transmitter IQ imbalance, wherein performing the equalization procedure results in equalized samples; and modulating analog versions of the equalized samples, resulting in an analog RF signal.

15. The method of claim 14, wherein performing the equalization procedure comprises filtering at least one of the processed real components or the processed imaginary components using an n-tap finite impulse response (FIR) filter having n programmable, real coefficients.

16. The method of claim 14, further comprising:

applying IQ gain correction and IQ phase correction to the equalized samples in order to compensate for offset frequency-independent components of the transmitter IQ imbalance.

17. The method of claim 16, further comprising performing a calibration procedure by:

producing calibration tones in the form of sequences of digital calibration tone samples;

providing the digital calibration tone samples to the transmitter lineup as the real components and the imaginary components;

receiving, by a receiver lineup, sequences of digital receive samples that represent transmitter and receiver processed versions of the digital calibration tone samples;

processing, by the receiver lineup, the digital calibration tone samples and the digital receive samples in order to generate filter coefficients that are utilized during performance of the equalization procedure; and processing the digital calibration tone samples and the digital receive samples in order to generate the IQ gain correction value and the IQ phase correction value that are utilized during application of the IQ gain correction and the IQ phase correction.

18. The method of claim 17, wherein performing the calibration procedure further comprises:

enabling a feedback path between an output of the transmitter lineup and an input of the receiver lineup; and configuring the transmitter lineup in a bypass mode in order to bypass the steps of performing the equalization procedure during the calibration procedure.

19. The method of claim 18, wherein performing the calibration procedure further comprises:

providing a control signal to a multiplexer to cause the multiplexer to provide the digital calibration tone samples to the transmitter lineup.

20. The method of claim 14, wherein modulating the analog versions comprises performing digital, multi-carrier modulation using Orthogonal Frequency Division Multiplexing.

* * * * *